(12) United States Patent
Arai

(10) Patent No.: US 12,360,053 B2
(45) Date of Patent: Jul. 15, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kimitaka Arai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 18/323,327

(22) Filed: May 24, 2023

(65) Prior Publication Data

US 2023/0393080 A1  Dec. 7, 2023

(30) Foreign Application Priority Data

Jun. 6, 2022  (JP) .................. 2022-091794

(51) Int. Cl.
| | | |
|---|---|---|
| *G01N 21/88* | (2006.01) | |
| *G06T 7/70* | (2017.01) | |
| *G06V 10/141* | (2022.01) | |
| *G06V 10/60* | (2022.01) | |
| *G06V 10/74* | (2022.01) | |

(52) U.S. Cl.
CPC ..... *G01N 21/8851* (2013.01); *G01N 21/8806* (2013.01); *G06T 7/70* (2017.01); *G06V 10/141* (2022.01); *G06V 10/60* (2022.01); *G06V 10/761* (2022.01)

(58) Field of Classification Search
CPC .. G01N 21/8851; G01N 21/8806; G06T 7/70; G06V 10/141; G06V 10/761; G06V 10/60
See application file for complete search history.

(56) References Cited

FOREIGN PATENT DOCUMENTS

| JP | 2003202216 A | * | 7/2003 | ............. G01B 11/24 |
| JP | 2017173300 A |   | 9/2017 | |
| JP | 2020153759 A | * | 9/2020 | ............. G01N 21/27 |

* cited by examiner

*Primary Examiner* — Jamil Ahmed
(74) *Attorney, Agent, or Firm* — Canon U.S.A., Inc. IP Division

(57) ABSTRACT

An image processing apparatus includes one or more computer-readable storage media, and one or more processors, wherein the one or more processors and the one or more computer-readable storage media are configured to: acquire image data acquired by capturing an image of an object, acquire distance information about a distance from an imaging apparatus, by which the captured image of the object is captured, to the object, acquire an optical profile representing an attribute of an image reflected on a surface of the object based on the image data and the distance information, and evaluate a state of the surface of the object based on the optical profile.

16 Claims, 19 Drawing Sheets

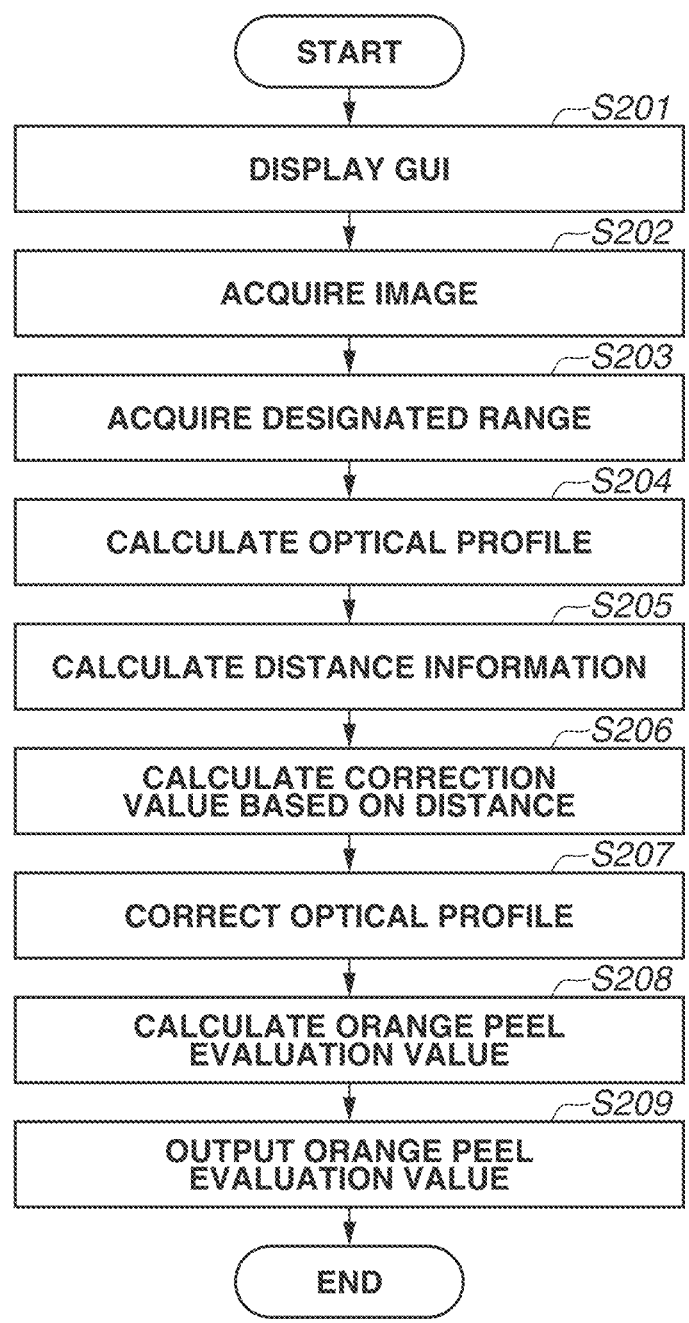

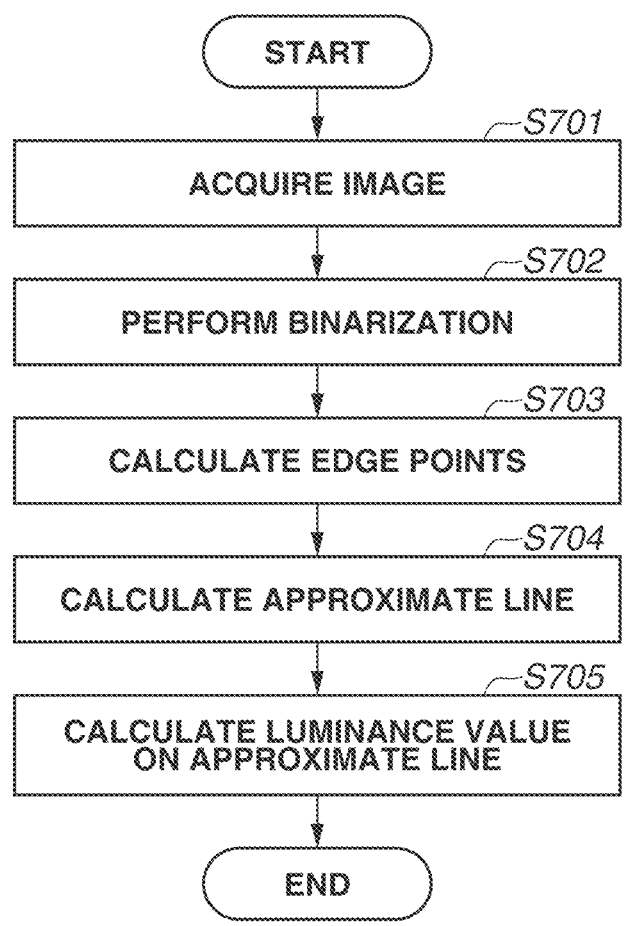

FIG.8

| SAMPLING POSITION | PROFILE VALUE |
|---|---|
| 1 | AAA |
| 2 | BBB |
| 3 | CCC |
| 4 | DDD |
| 5 | EEE |
| ⋮ | |
| w | XXX |

FIG.10

| SAMPLING POSITION | DISTANCE BETWEEN INTERSECTIONS |
|---|---|
| 1 | aaa |
| 2 | bbb |
| 3 | ccc |
| 4 | ddd |
| 5 | eee |
| ⋮ | |
| w | xxx |

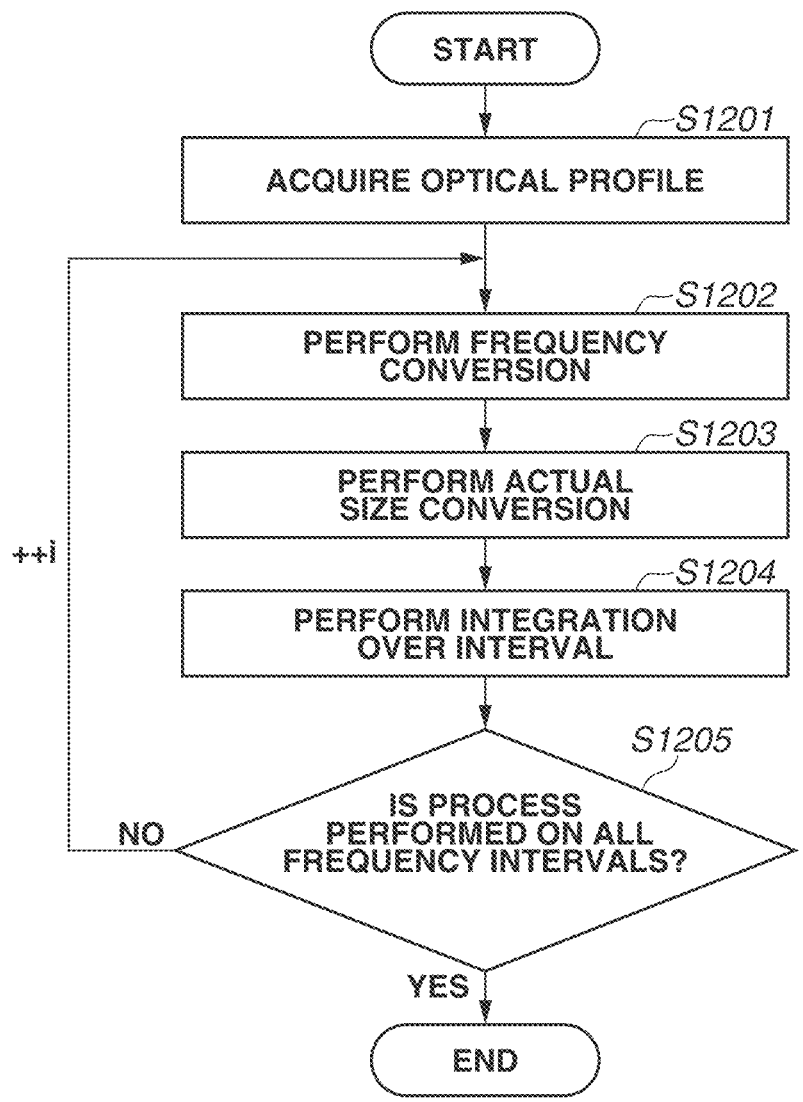

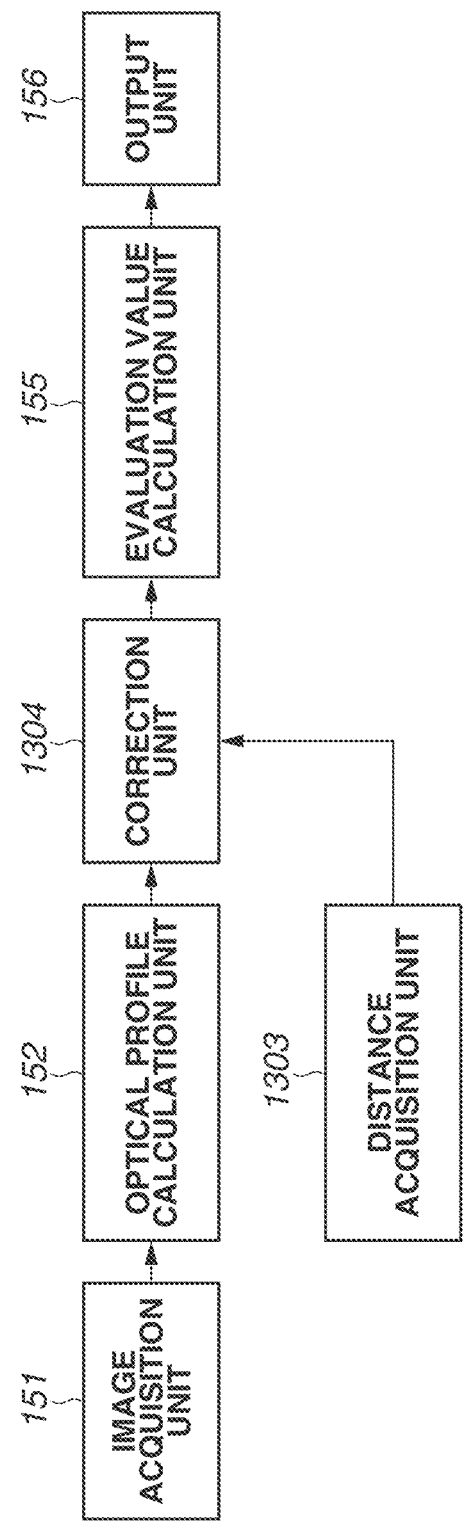

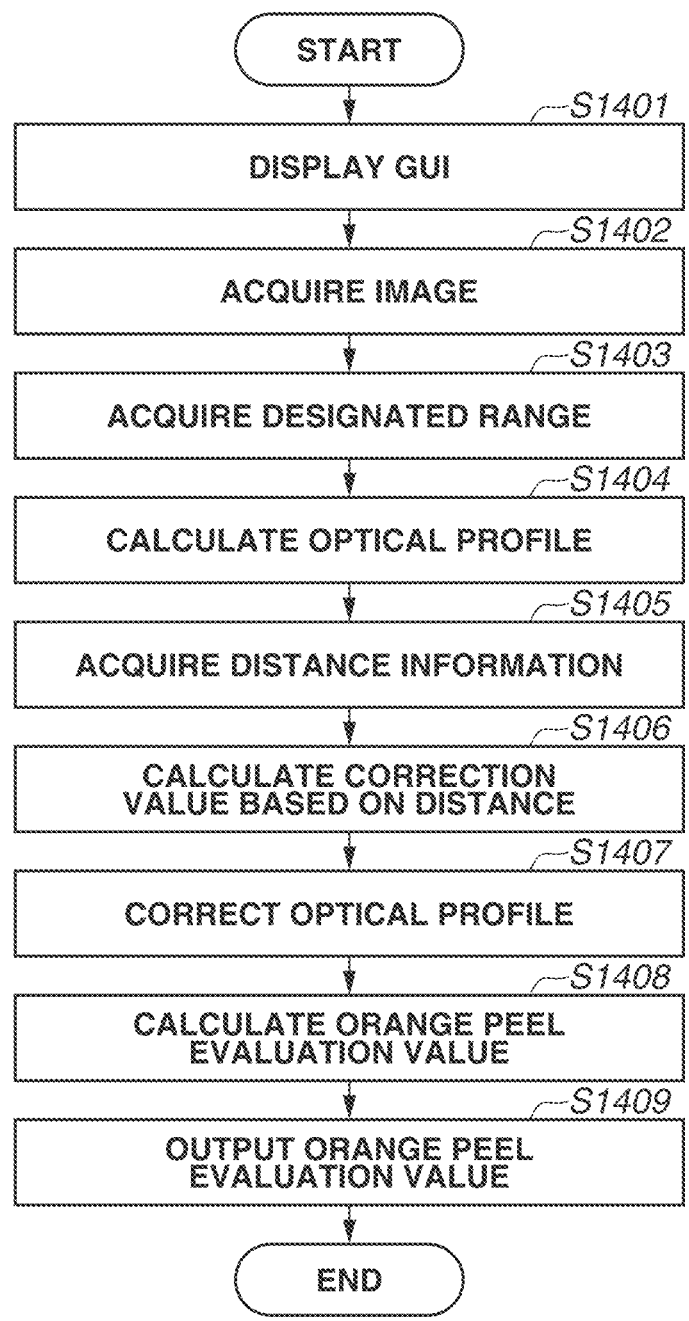

FIG.16

| SAMPLING POSITION | DISTANCE |
|---|---|
| 1 | aaa |
| 2 | bbb |
| 3 | ccc |
| 4 | ddd |
| 5 | eee |
| ⋮ | |
| w | xxx |

FIG.19

| FREQUENCY | CORRECTION DATA |
|---|---|
| f1 | Aaa |
| f2 | Bbb |
| f3 | Ccc |
| f4 | Ddd |
| f5 | Eee |
| ⋮ | |
| fn | Xxx |

IMAGE PROCESSING APPARATUS, IMAGE PROCESSING METHOD, AND STORAGE MEDIUM

BACKGROUND

Field of the Disclosure

The present disclosure relates to a technique for evaluating a surface state of an object.

Description of the Related Art

In the field of industrial design, it is important to check a surface state of an object because the surface state contributes to the design quality of the object. Japanese Patent Application Laid-Open No. 2017-173300 discusses a method for evaluating a surface state of an object by capturing an image of a projection pattern reflected on a surface of the object using a camera, calculating an amount of change in shape of the projection pattern based on the captured image, and evaluating the surface state of the object based on the amount of change in shape and sensory evaluation information acquired in advance.

The technique discussed in Japanese Patent Application Laid-Open No. 2017-173300 calculates the amount of change in shape of the projection pattern based on the captured image of the projection pattern on the surface of the object. However, the amount of change in shape of the projection pattern captured in the captured image changes in a case where an image capturing distance changes. Thus, with the technique discussed in Japanese Patent Application Laid-Open No. 2017-173300, it is difficult to evaluate a surface state of an object adequately in a case where the image capturing distance changes.

SUMMARY

Embodiments in the present disclosure enable evaluation of a surface state of an evaluation target object even in a case where an image capturing distance changes.

According to an aspect of the present disclosure, an image processing apparatus includes one or more computer-readable storage media, and one or more processors, wherein the one or more processors and the one or more computer-readable storage media are configured to: acquire image data acquired by capturing an image of an object, acquire distance information about a distance from an imaging apparatus, by which the captured image of the object is captured, to the object, acquire an optical profile representing an attribute of an image reflected on a surface of the object based on the image data and the distance information, and evaluate a state of the surface of the object based on the optical profile.

Further features of various embodiments will become apparent from the following description of exemplary embodiments with reference to the attached drawings.

BRIEF DESCRIPTION OF THE DRAWINGS

FIG. 2 is a flowchart illustrating an image processing process according to the first exemplary embodiment.

FIG. 7 is a flowchart illustrating an optical profile calculation process.

FIG. 8 is a diagram illustrating an example of an optical profile.

FIG. 10 is a diagram illustrating an example of distance information about a distance between the intersections.

FIG. 12 is a flowchart illustrating an evaluation value acquisition process.

FIG. 13 is a diagram illustrating an example of a configuration of an image processing apparatus according to a second exemplary embodiment.

FIG. 14 is a flowchart illustrating an image processing process according to the second exemplary embodiment.

FIG. 16 is a diagram illustrating an example of distance information according to the second exemplary embodiment.

FIG. 19 is a diagram illustrating an example of modulation transfer function (MTF) correction data.

DESCRIPTION OF THE EMBODIMENTS

Figure 1A:
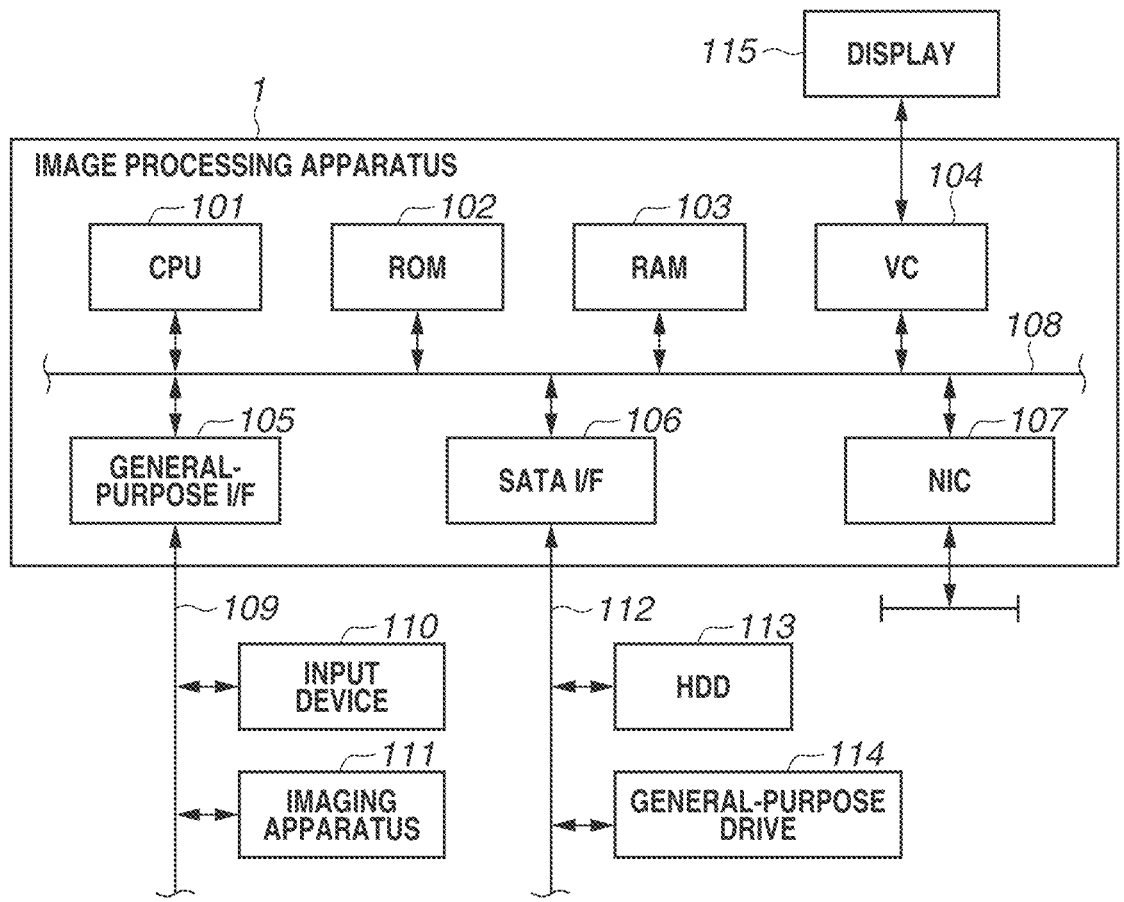
FIGS. 1A and 1B are diagrams illustrating an example of a configuration of an image processing apparatus according to a first exemplary embodiment.

Various exemplary embodiments of the present disclosure will be described below with reference to the drawings. The exemplary embodiments described below are not intended to limit every embodiment, and not all combinations of features described in the exemplary embodiments are necessarily essential to the technical solution provided by every embodiment. A configuration according to the exemplary embodiments can be modified or changed suitably for a specification of an apparatus to which the present disclosure is applied and/or various conditions (use condition, use environment). Further, parts of the below-described exemplary embodiments can be combined suitably. Corresponding components according to the exemplary embodiments are given the same reference numeral and are described with reference to the given reference numeral.

<Description of Example of Evaluation of Surface State of Object>

Image processing in evaluating so-called "orange peel", which is an example of an object surface state that contributes to design quality in the field of industrial design, according to the exemplary embodiments will be described below as an example. The orange peel is also referred to as roughness and is a state where fine irregularities are formed on an object surface. For example, in painting an automobile body, paint applied using a spray gun may harden before drying into a smooth surface on a surface of the body. In this case, fine irregularities are formed on the surface of the body. This state is referred to as orange peel, and the surface of the body is different from an intended smooth, glossy surface. This decreases design quality of the automobile. An image processing apparatus according to the present exemplary embodiment calculates an evaluation value for evaluating a level of orange peel on an object surface and presents the evaluation value to a user to notify the user of a level of development of unintended orange peel. The orange peel level can also be referred to as a roughness level of an object surface. Further, there are various types of orange peel states with various cycles of irregularities from small to large. Referring to a cycle of irregularities of an orange peel state as wavelength, an orange peel state with a large wavelength can be referred to as low frequency, whereas an orange peel state with a small wavelength can be referred to as high frequency. According to the present exemplary embodiment, a surface of an evaluation target object is imaged by an imaging apparatus, and an evaluation value for a surface state of the object is calculated from an acquired image (hereinafter, referred to as "captured image"). According to the present exemplary embodiment, a case where orange peel developed by painting is to be evaluated is intended, so that an image processing apparatus calculates the evaluation value based on the captured image data on the painted evaluation target object. While the evaluation target object according to the present exemplary embodiment is an object that is generally flat in shape before being painted, the evaluation target object does not have to be perfectly flat before being painted and can be substantially flat with fine irregularities in its surface to an extent not affecting the evaluation of orange peel developed after painting.

<Hardware Configuration of Image Processing Apparatus>

FIG. 1A is a diagram illustrating an example of a hardware configuration of an image processing apparatus 1 according to a first exemplary embodiment.

The image processing apparatus 1 includes a central processing unit (CPU) 101, a read-only memory (ROM) 102, and a random access memory (RAM) 103. Further, the image processing apparatus 1 includes a video card (VC) 104, a general-purpose interface (general-purpose I/F) 105, a serial advanced technology attachment (SATA) interface (I/F) 106, and a network interface card (NIC) 107. The CPU 101 executes an operating system (OS) and various programs stored in the ROM 102 or a hard disk drive (HDD) 113 using the RAM 103 as a work memory. Further, the CPU 101 controls each component via a system bus 108. Processes illustrated in flowcharts according to the present exemplary embodiment described below are performed by the CPU 101 by loading program codes stored in the ROM 102 or the HDD 113 to the RAM 103 and executing the loaded program codes. A display 115 is connected to the VC 104. An input device 110, such as a mouse and a keyboard, and an imaging apparatus 111 are connected to the general-purpose I/F 105 via a serial bus 109. A general-purpose drive 114 for reading from and writing to the HDD 113 and various recording mediums is connected to the SATA I/F 106 via a serial bus 112. The NIC 107 receives information input from and outputs information to external apparatuses. The CPU 101 uses the HDD 113 and various recording mediums mounted on the general-purpose drive 114 as storage areas for various types of data. The CPU 101 displays a graphical user interface (GUI) provided by a program on the display 115 and receives inputs, such as user instructions, received via the input device 110.

<Functional Configuration of Image Processing Apparatus According to First Exemplary Embodiment>

Figure 1B:
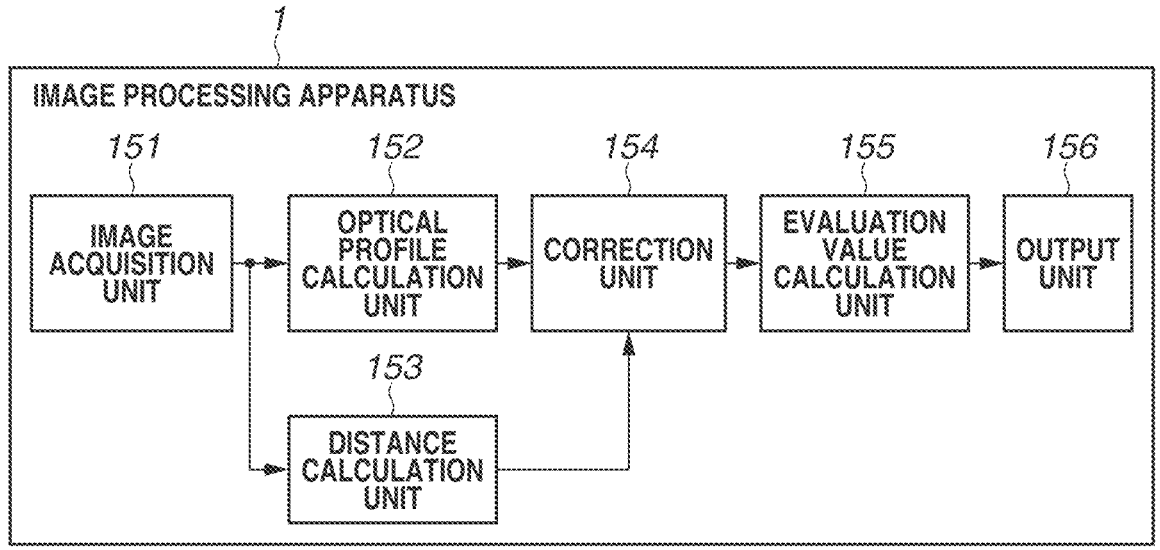

FIG. 1B is a functional block diagram illustrating a functional configuration of the image processing apparatus 1 according to the first exemplary embodiment. The CPU 101 functions as each functional unit illustrated in FIG. 1B by reading a program stored in the ROM 102 or the HDD 113 and executing the read program using the RAM 103 as a work memory. Not all processes of the functional units described below must be performed by the CPU 101, and the image processing apparatus 1 can be configured so that the processes are performed partially or entirely by a single processing circuit or a plurality of processing circuits other than the CPU 101.

The image processing apparatus 1 includes an image acquisition unit 151, an optical profile calculation unit 152, a distance calculation unit 153, a correction unit 154, an evaluation value calculation unit 155, and an output unit 156.

The image acquisition unit 151 acquires captured image data acquired by capturing an image of an evaluation target object by the imaging apparatus 111. Image data that the image acquisition unit 151 acquires is data acquired in advance by capturing an image of an object and storing the captured image in the HDD 113 by the imaging apparatus 111. Hereinafter, unless distinction is necessary in description, image data will be referred to simply as "image".

The optical profile calculation unit 152 calculates, from the image acquired by the image acquisition unit 151, an optical profile representing an attribute of an image reflected on a surface of the evaluation target object by performing an optical profile acquisition process described below. The optical profile calculation unit 152 calculates, as an optical profile representing an attribute of the image reflected on the surface of the evaluation target object, a luminance profile of an edge of a projection image reflected on the surface of the object. Details thereof will be described below. According to the present exemplary embodiment, a case where, for example, a projection image (hereinafter, referred to as "illumination image") of a linear illumination light source that is reflected on a surface of an object is captured in a state where the object is illuminated by the illumination light source is described as an example. Specifically, according to the present exemplary embodiment, the optical profile calculation unit 152 acquires, as an optical profile, luminance information about an edge of the illumination image included in the captured image.

The distance calculation unit 153 calculates distance information from the captured image acquired by the imaging apparatus 111.

The distance calculation unit 153 according to the first exemplary embodiment calculates distance information having a correlation with an image capturing distance from the imaging apparatus 111 to the object using the illumination image that is the projection image of the illumination light source in the captured image. Details of a distance information calculation process by the distance calculation unit 153 will be described below.

The correction unit 154 acquires a correction value for correcting the optical profile calculated by the optical profile calculation unit 152. According to the present exemplary embodiment, the correction unit 154 calculates a correction value for the optical profile based on the distance information calculated by the distance calculation unit 153. Details thereof will be described below. The correction unit 154 corrects the optical profile using the calculated correction value. Details thereof will also be described below.

The evaluation value calculation unit 155 calculates an evaluation value from the optical profile corrected by the correction unit 154 by performing an evaluation value acquisition process described below.

The output unit 156 outputs the evaluation value calculated by the evaluation value calculation unit 155.

<Operations and Image Processing by Image Processing Apparatus>

FIG. 2 is a flowchart illustrating operations and a flow of image processing by the image processing apparatus 1 illustrated in FIGS. 1A and 1B. It is to be noted that the image processing apparatus 1 does not have to perform all steps in the flowcharts described below. Further, an order of steps in each flowchart can be changed as needed.

In step S201, the CPU 101 displays a GUI illustrated in FIG. 4 described below on the display 115 by executing a program stored in the HDD 113. Details of the GUI illustrated in FIG. 4 will be described below.

In step S202, the image acquisition unit 151 acquires a captured image based on a user instruction via the GUI illustrated in FIG. 4 described below. The image acquired in step S202 by the image acquisition unit 151 is an image of an evaluation target object that is captured by the imaging apparatus 111 in an image capturing condition illustrated in FIG. 3 described below and is stored in the HDD 113. Specifically, the image acquisition unit 151 acquires the image from the HDD 113 based on the user instruction via the GUI in FIG. 4.

In step S203, the optical profile calculation unit 152 acquires range designation data representing an evaluation target range designated for the captured image by a user via the GUI in FIG. 4 described below.

Next, in step S204, the optical profile calculation unit 152 calculates an optical profile as described below from an image in the evaluation target range designated for the captured image in step S203.

In step S205, the distance calculation unit 153 calculates distance information having a correlation with an image capturing distance from the imaging apparatus 111 to the object based on an illumination image that is a projection image of the illumination light source in the captured image. According to the present exemplary embodiment, the distance information having a correlation with the image capturing distance from the imaging apparatus 111 to the object is distance information corresponding to a width of the illumination image included in the captured image of the object that is captured by the imaging apparatus 111. Details thereof will be described below.

Next, in step S206, the correction unit 154 calculates a correction value based on the distance information calculated by the distance calculation unit 153. The correction unit 154 calculates a correction value based on the width (distance information calculated by the distance calculation unit 153) of the illumination image in the captured image of the object that is captured by the imaging apparatus 111 and a width of an illumination image in a case where the imaging is performed at a reference image capturing distance. Details thereof will be described below.

Then, in next step S207, the correction unit 154 corrects the optical profile using the correction value calculated in step S206.

Then, in step S208, the evaluation value calculation unit 155 calculates an evaluation value (orange peel evaluation value according to the present exemplary embodiment) based on the optical profile corrected in step S207. Details of an evaluation value calculation process will be described below.

Thereafter, in step S209, the output unit 156 outputs the evaluation value to the display 115.

<Image Capturing Condition for Evaluation Target Object>

Figure 3:
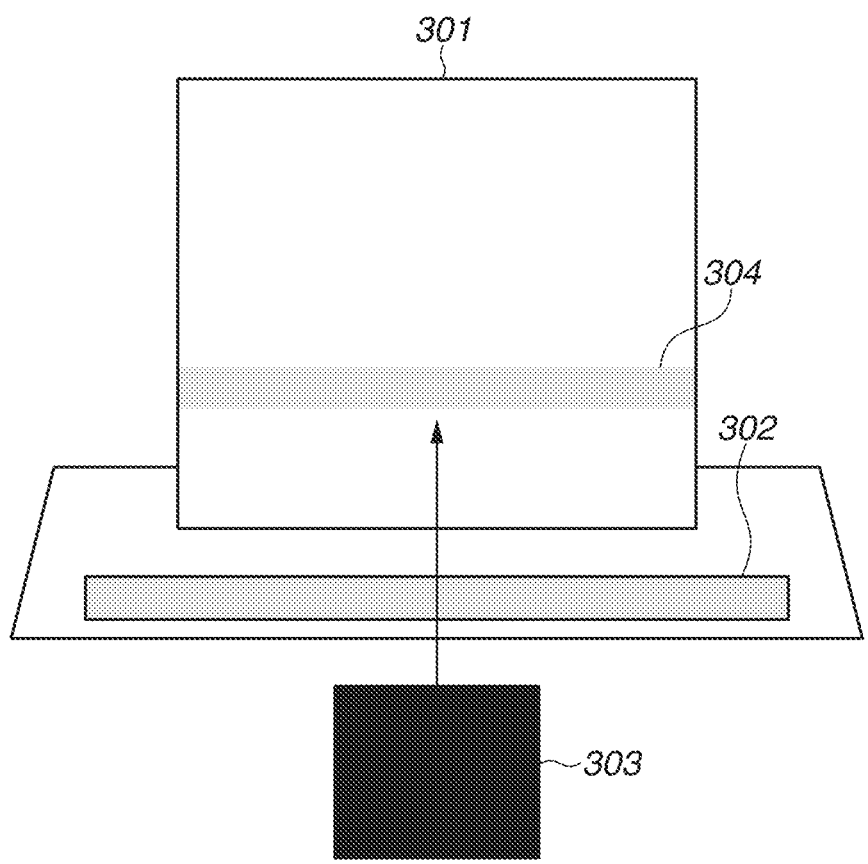
FIG. 3 is a diagram illustrating an example of a method for imaging an evaluation target object.

FIG. 3 is a schematic diagram illustrating an example of an image capturing condition for imaging an evaluation target object. An object 301 is a subject to be imaged by an imaging apparatus 303 and is an evaluation target object according to the present exemplary embodiment. An illumination light source 302 is a linear illumination light source for illuminating the object 301 and is situated at a distance from the object 301 to avoid contact with the object 301. In the image capturing condition illustrated in FIG. 3, part of light from the illumination light source 302 is projected onto a surface of the object 301, so that the light from the illumination light source 302 is reflected as a linear illumination image 304 on the surface of the object 301.

Then, the imaging apparatus 303 (the imaging apparatus 111 in FIG. 1A) captures an image of the surface of the object 301 including the illumination image 304. The above-described captured image stored in the HDD 113 is an image captured in the image capturing condition as illustrated in FIG. 3.

Since the illumination light source 302 is a linear light source as described above, in a case where the surface of the object 301 is a smooth surface, an edge of the illumination image 304 is to be a linear edge. It is to be noted that in a case where the object 301 has an uneven surface, the edge of the illumination image 304 is not a straight line but a bumpy line. According to the present exemplary embodiment, an optical profile is calculated based on a state of a neighborhood of the edge of the illumination image 304 reflected on the surface of the object 301, and an evaluation value for evaluating an orange peel level is calculated based on the calculated optical profile. According to the present exemplary embodiment, an evaluation value for the orange peel evaluation on a painted surface of the evaluation target object, which is flat in shape before the painting, is calculated.

<GUI>

Figure 4:
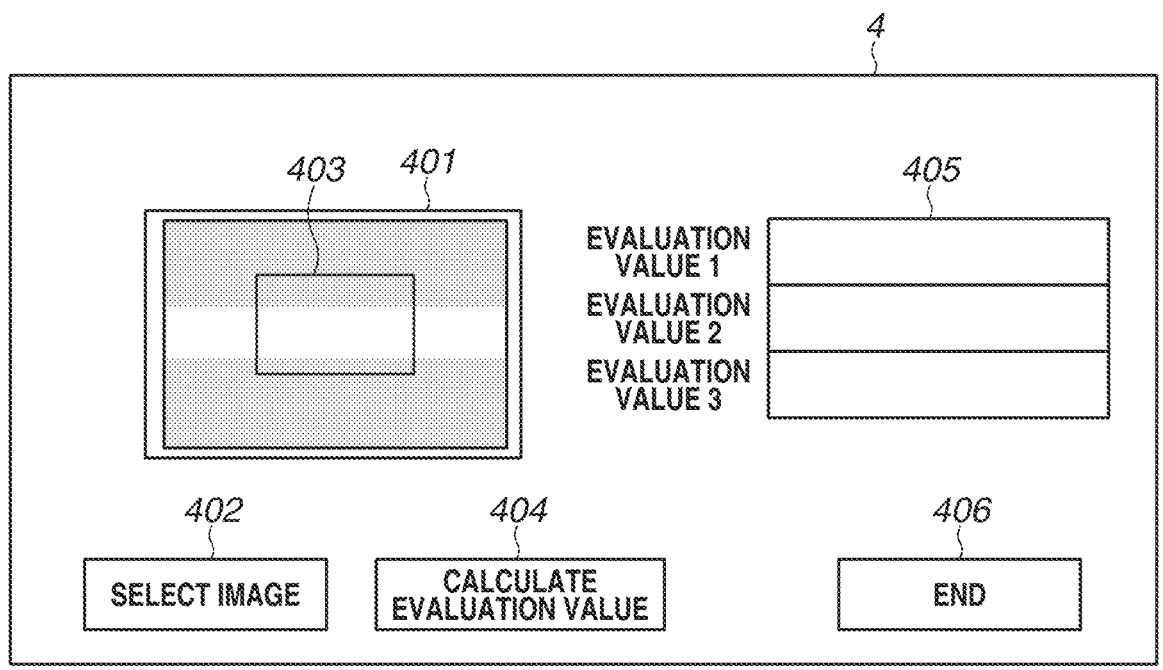
FIG. 4 is a diagram illustrating an example of a graphical user interface (GUI).

FIG. 4 is a diagram illustrating an example of a GUI 4 displayed on the display 115.

An image display window 401 is a window where an image selected based on a user instruction from the captured images captured by the imaging apparatus 111 and stored in the HDD 113 is displayed. A SELECT IMAGE button 402 is a button to be pressed by the user in selecting the image displayed in the image display window 401 from the captured images stored in the HDD 113. An evaluation range designation region 403 is a rectangular region indicating an evaluation range that is an orange peel evaluation target in the image displayed in the image display window 401. The evaluation range designation region 403 can be designated as desired by the user. A CALCULATE EVALUATION VALUE button 404 is a button to be pressed by the user to issue an instruction to perform the evaluation value acquisition process on the image of the evaluation range designated via the evaluation range designation region 403. An evaluation value display box 405 is a textbox where numbers representing calculated evaluation values are displayed. An END button 406 is a button to be selected by the user to end an image processing program (referred to as "image processing application") for evaluating an object surface state according to the present exemplary embodiment.

Figure 5:
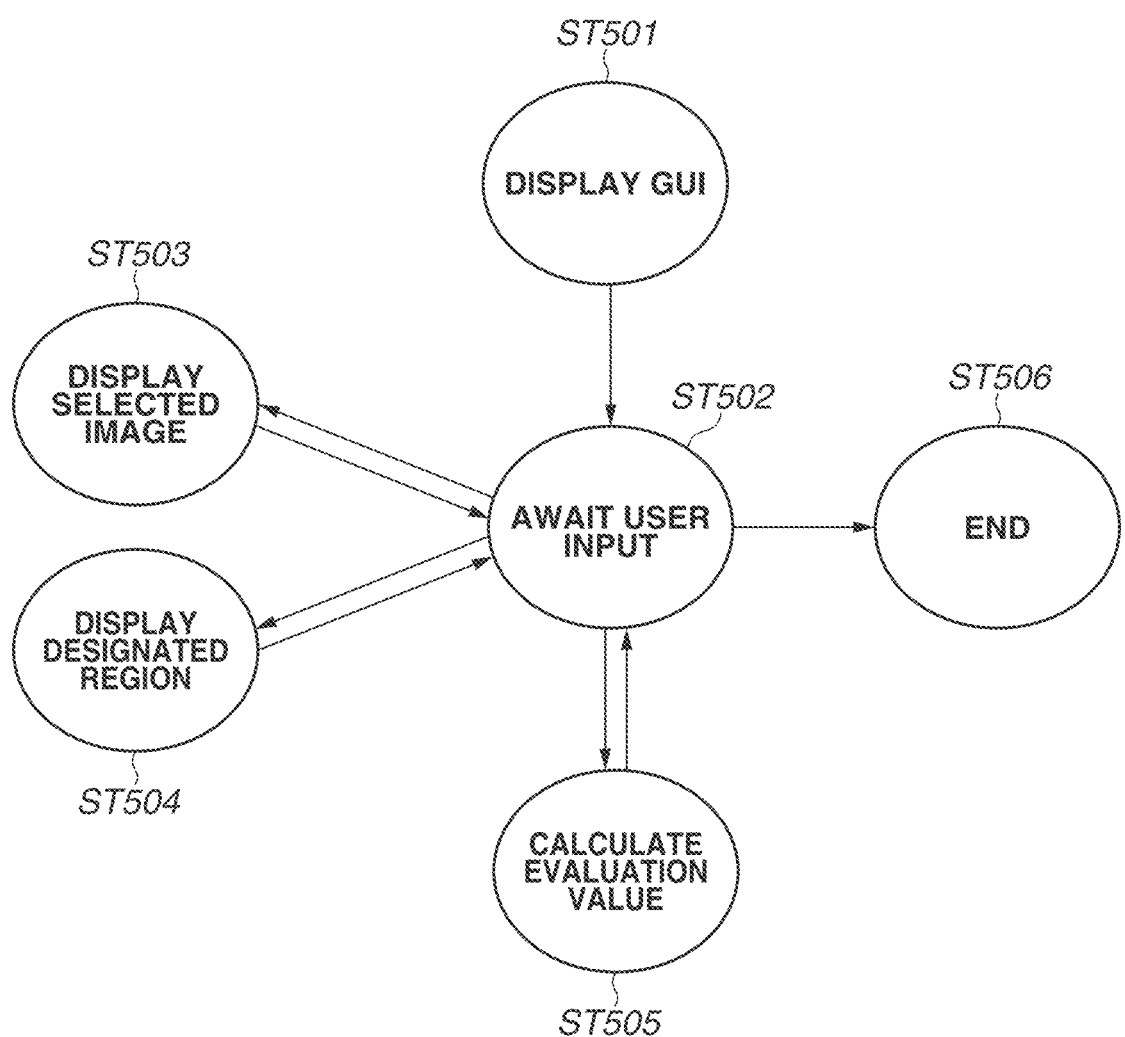
FIG. 5 is a diagram illustrating state transitions of the GUI.

FIG. 5 is a diagram illustrating state transitions of the image processing apparatus 1 in the example of the GUI illustrated in FIG. 4 according to the present exemplary embodiment.

In a case where the image processing application according to the present exemplary embodiment is activated based on a user instruction, the image processing apparatus 1 changes to a state ST501, displays the GUI described above, and then changes to a state ST502. Then, in a case where the image processing apparatus 1 has changed to the state ST502, the image processing apparatus 1 awaits user input. In a case where, for example, the SELECT IMAGE button 402 is pressed in the state ST502, the image processing apparatus 1 changes to a state ST503. Further, in a case where a user operation is performed to designate the evaluation range designation region 403 in the state ST502, the image processing apparatus 1 changes to a state ST504. Further, in a case where the CALCULATE EVALUATION VALUE button 404 is pressed in the state ST502, the image processing apparatus 1 changes to a state ST505. Further, in a case where the END button 406 is pressed in the state ST502, the image processing apparatus 1 changes to a state ST506.

In a case where the image processing apparatus 1 has changed to the state ST503, the image processing apparatus 1 displays an image selected by the user in the image display window 401 and thereafter changes to the state ST502.

In a case where the image processing apparatus 1 has changed to the state ST504 and an evaluation range is designated based on a user instruction, the image processing apparatus 1 displays the evaluation range designation region 403 in the image display window 401 and thereafter changes to the state ST502.

In a case where the image processing apparatus 1 has changed to the state ST505, the image processing apparatus 1 calculates an evaluation value, displays the calculated evaluation value in the evaluation value display box 405, and thereafter changes to the state ST502.

In a case where the image processing apparatus 1 has changed to the state ST506, the image processing apparatus 1 performs an operation for ending the image processing application.

Figure 6A:
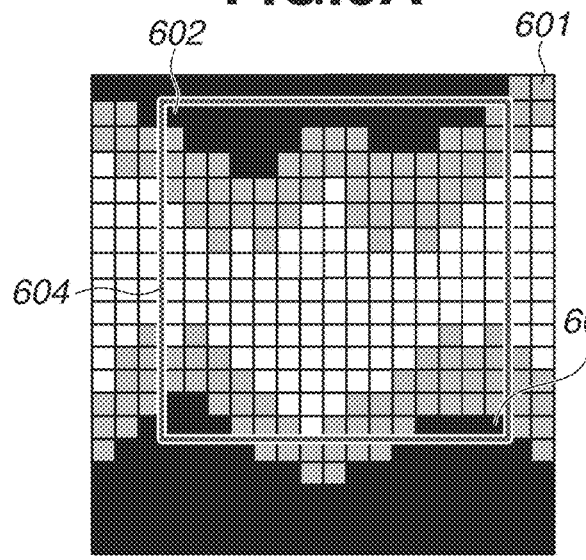
FIGS. 6A, 6B, 6C, and 6D are diagrams illustrating an evaluation target range and an edge.

FIG. 6A is a diagram schematically illustrating an example of an image 601 acquired in step S202 in the flowchart in FIG. 2 and an evaluation target range 604 (the evaluation range designation region 403 in FIG. 4) designated for the image 601. The evaluation target range 604 is set by receiving rectangle information about the evaluation range designation region 403 designated by the user with respect to the image displayed in the image display window 401 in FIG. 4. More specifically, the image processing apparatus 1 receives coordinate values of a start point 602 and an end point 603 of the rectangle specified by the user and sets the evaluation target range 604 with the start point 602 being an upper left pixel of the rectangle and the end point 603 being a lower right pixel of the rectangle. The start point 602 and the end point 603 are designated by, for example, inputting coordinate values via the input device 110. As described above, the image processing apparatus 1 according to the present exemplary embodiment sets the rectangular region (the evaluation range designation region 403) defined by the start point 602 and the end point 603 as the evaluation target range 604 and generates range designation data representing the evaluation target range 604.

<Optical Profile Calculation Process>

FIG. 7 is a flowchart illustrating details of the flow of the optical profile calculation process performed by the optical profile calculation unit 152 in step S204 in FIG. 2.

In step S701, the optical profile calculation unit 152 acquires an image from the image acquisition unit 151.

Figure 6B:
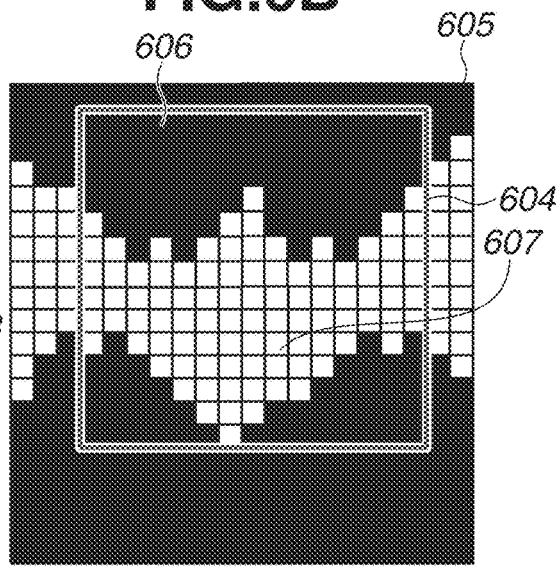

Next, in step S702, the optical profile calculation unit 152 binarizes each pixel value of the image using a predetermined threshold for binarization. According to the present exemplary embodiment, for example, an average luminance of the pixels in the evaluation target range 604 is used as the threshold for binarization. The binarization process in step S702 is a process of changing a pixel value greater than or equal to the threshold to 1 (black pixel) and changing a pixel value less than the threshold to 0 (white pixel). FIG. 6B illustrates an image 605 as a result of the binarization process on the image 601 in FIG. 6A. The image 605 consists of black pixels 606 with a pixel value of 1 and white pixels 607 with a pixel value of 0.

Next, in step S703, the optical profile calculation unit 152 performs edge detection on the binarized image 605. Coordinates (x, y) of the start point 602 herein are $(x_{st}, y_{st})$, and coordinates (x, y) of the end point 603 herein are $(x_{ed}, y_{ed})$. Specifically, the optical profile calculation unit 152 searches pixels with a y-value from $y_{st}$ to $y_{ed}$ for each x-value from $x_{st}$ to $x_{ed}$ and determines a pixel having a different pixel value from an adjacent pixel as a point that forms an edge (hereinafter, the point will be referred to as "edge point"). An adjacent pixel is a pixel that is adjacent in the y-direction. For example, adjacent pixels to a pixel at coordinates (X, Y) are a pixel at coordinates (X, Y−1) and a pixel at coordinates (X, Y+1). In a case where there is a plurality of edge points for one x-value, the optical profile calculation unit 152 determines an edge point with a smaller distance from a straight line connecting the start point 602 and the end point 603 together as an edge point. By the foregoing processing, an edge formed by the edge points is detected.

Next, in step S704, the optical profile calculation unit 152 calculates an approximate line by approximating the edges (set of edge points) detected in step S703 using a linear function. According to the present exemplary embodiment, an approximate straight line calculated using a known least squares method is an approximate line calculated by approximating the set of edge points using the linear function.

Next, in step S705, the optical profile calculation unit 152 calculates luminances of pixel positions on the approximate straight line calculated in step S704 as an optical profile (luminance profile).

Figure 6C:
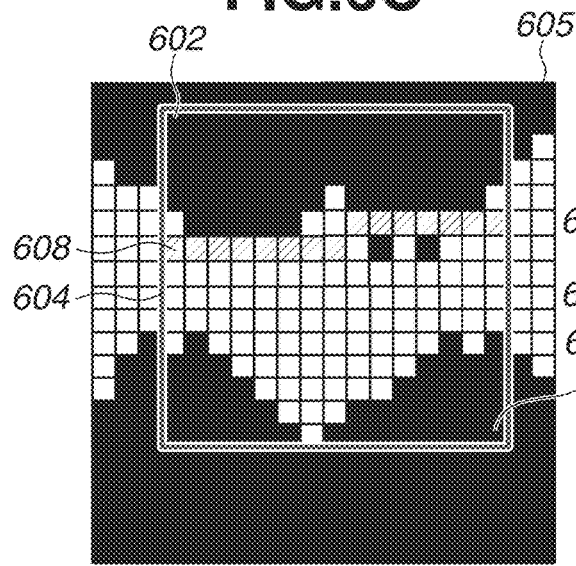

FIG. 6C is a diagram schematically illustrating an approximate straight line calculated by the optical profile calculation unit 152. A line segment formed by shaded pixels in FIG. 6C is an approximate line 608.

FIG. 8 is a diagram illustrating an example of optical profile data. In FIG. 8, each sampling position corresponds to a pixel position in the y-direction on the approximate straight line. Each profile value indicates information about a neighborhood of the approximate line and is a luminance on the approximate straight line according to the present exemplary embodiment.

According to the present exemplary embodiment, an optical profile is calculated from an illumination image reflected on an object surface in an image of the evaluation target object 301 that is captured in the image capturing condition in FIG. 3 described above, and an orange peel evaluation value is calculated based on the calculated optical profile. It is to be noted that in a case where the image capturing distance from the imaging apparatus 303 to the object 301 changes, the amount of change in shape of the illumination image reflected on the object surface also changes. Specifically, in a case where the image capturing distance changes, the amount of change in shape of the illumination image reflected on the object surface also changes, so that the orange peel evaluation value calculated from the optical profile calculated from the illumination image also changes. This makes it difficult to evaluate the object surface state adequately. Thus, the image processing apparatus 1 according to the present exemplary embodiment calculates distance information having a correlation with the image capturing distance from the imaging apparatus 303 to the object 301 from the captured image of the object surface and calculates a correction value for the optical profile based on the distance information. Then, the image processing apparatus 1 according to the present exemplary embodiment corrects the optical profile using the correction value to enable evaluation of the surface state of the evaluation target object even in a case where the image capturing distance changes.

<Distance Information Calculation Process>

Figure 9:
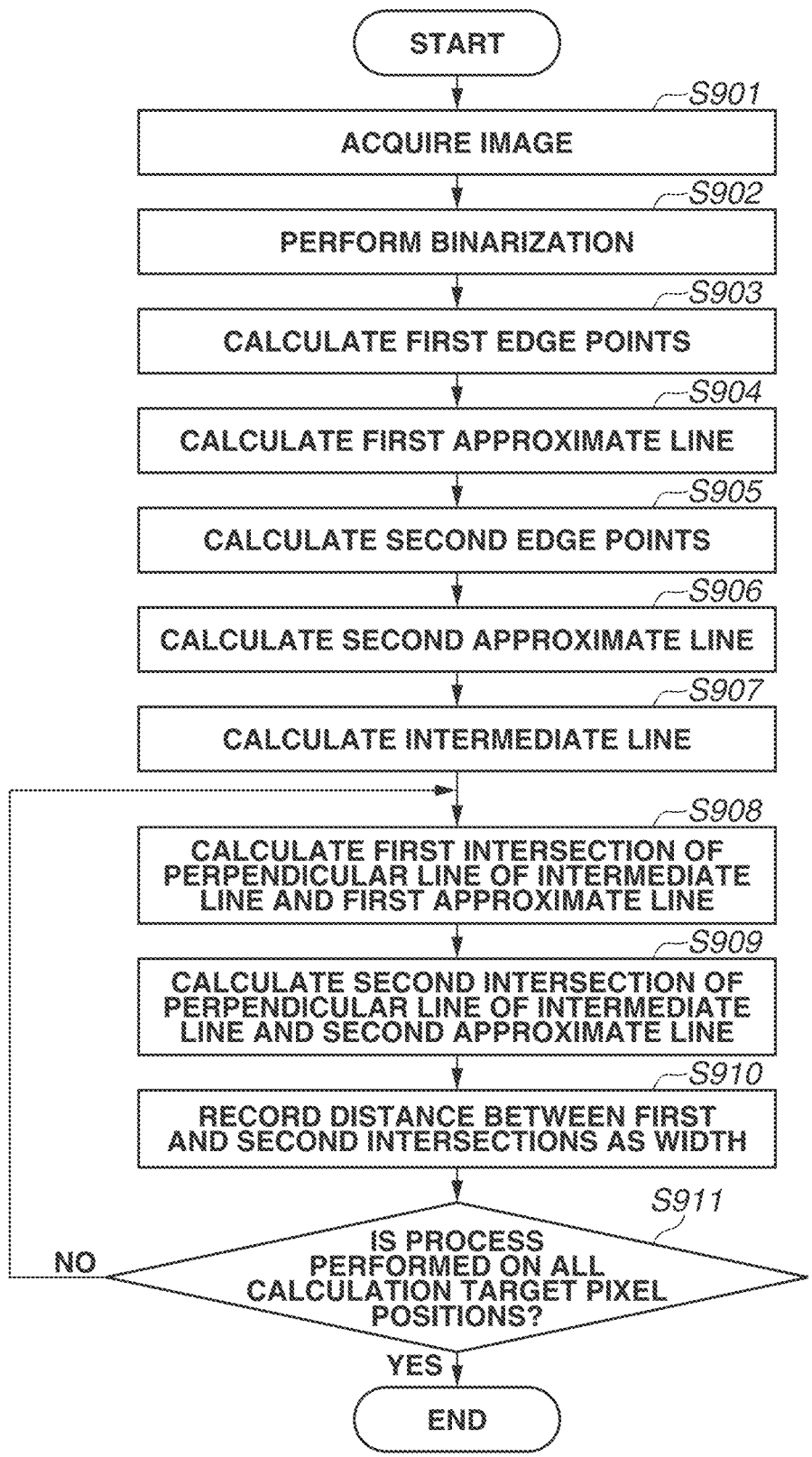
FIG. 9 is a flowchart illustrating a distance information calculation process according to the first exemplary embodiment.

FIG. 9 is a flowchart illustrating a detailed flow of the process of calculating distance information having a correlation with the image capturing distance by the distance calculation unit 153 based on the illumination image reflected on the object surface in the captured image in step S205 in FIG. 2.

First, in step S901, the distance calculation unit 153 acquires a captured image from the image acquisition unit 151.

Next, in step S902, the distance calculation unit 153 binarizes each pixel value of the image represented by image data using the predetermined threshold for binarization. Specifically, the image 605 in FIG. 6B as a result of the binarization process is generated from the image 601 in FIG. 6A described above. As described above, the distance calculation unit 153 can acquire an image generated as a result of binarizing the captured image by the optical profile calculation unit 152.

Figure 6D:
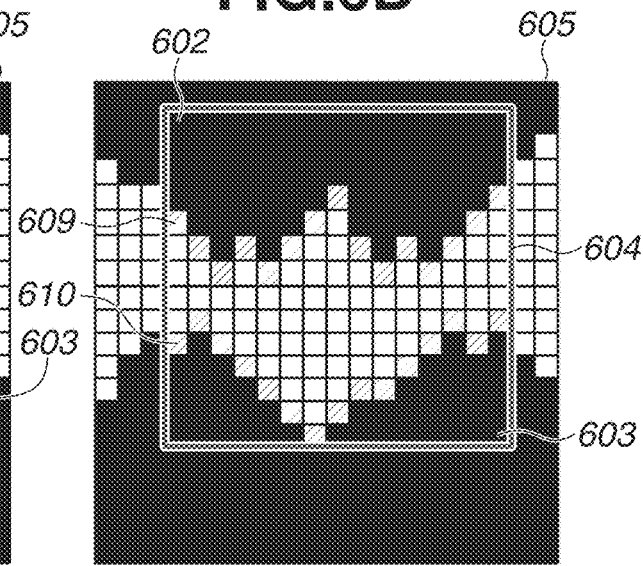

Next, in step S903, the distance calculation unit 153 detects a first edge from the image with the pixel values binarized in step S902. A case where the coordinates of the start point 602 of the evaluation target range 604 are $(x_{st}, y_{st})$ and the coordinates of the end point 603 of the evaluation target range 604 are $(x_{ed}, y_{ed})$ as described above will be described below. The distance calculation unit 153 searches pixels with a y-value from $y_{st}$ to $y_{ed}$ for each x-value from $x_{st}$ to $x_{ed}$ and determines a pixel having a different pixel value from an adjacent pixel as a point that forms an edge (edge point). In a case where there is a plurality of edge points for one x-value, the distance calculation unit 153 determines an edge point with a smaller distance from the straight line connecting the start point 602 and the end point 603 together as an edge point. FIG. 6D is a diagram schematically illustrating edges detected from the binarized image 605 illustrated in FIG. 6B. As illustrated in FIG. 6D, the distance calculation unit 153 determines each pixel having a different pixel value from an adjacent pixel as an edge forming point 609 (shaded points in FIG. 6D) and detects the edge forming points 609 as a first edge.

Then, in step S904, the distance calculation unit 153 calculates a first approximate straight line by approximating the first edge (set of edge points) detected in step S903 using a linear function. Specifically, the first approximate straight line is an approximate straight line based on the first edge formed by the edge forming points 609 in FIG. 6D.

Next, in step S905, the distance calculation unit 153 detects a second edge from the image with the pixel values binarized in step S902 (the image 605 in FIG. 6B). In step S905, as in step S903, the coordinates of the start point 602 and the end point 603 are respectively $(x_{st}, y_{st})$ and $(x_{ed}, y_{ed})$, pixels with a y-value from $y_{ed}$ to $y_{st}$ are searched for each x-value from $x_{ed}$ to $x_{st}$, and a pixel having a different pixel value from an adjacent pixel is determined as an edge point. At this time, as in step S903, in a case where there is a plurality of edge points for one x-value, an edge point with a smaller distance from the straight line connecting the start point 602 and the end point 603 together is determined as an edge point. Then, the distance calculation unit 153 determines each pixel having a different pixel value from an adjacent pixel as illustrated in FIG. 6D as an edge forming point 610 (shaded points in FIG. 6D) and detects the edge forming points 610 as a second edge.

Then, in step S906, the distance calculation unit 153 calculates a second approximate straight line by approximating the second edge (set of edge points) detected in step S905 using a linear function. Specifically, the second approximate straight line is an approximate straight line based on the second edge formed by the edge forming points 610 in FIG. 6D.

Next, in step S907, the distance calculation unit 153 calculates a straight line that is an intermediate line between the first approximate straight line and the second approximate straight line. The intermediate line can be expressed by the following formula (1):

$$y = \frac{(A_1 + A_2)}{2}x + \frac{(B_1 + B_2)}{2}, \qquad (1)$$

where $A_1$ is a slope of the first approximate straight line, $B_1$ is an intercept of the first approximate straight line, $A_2$ is a slope of the second approximate straight line, and $B_2$ is an intercept of the second approximate straight line.

Next, in step S908, the distance calculation unit 153 calculates an intersection of the first approximate straight line and a perpendicular line of the intermediate line as a first intersection. The perpendicular line of the intermediate line can be expressed by the following formula (2):

$$y = \frac{-2}{A_1 + A_2}x + y_i + \frac{2}{A_1 + A_2}x_i, \qquad (2)$$

where x corresponds to a pixel position on the intermediate line, $x_i$ is x of a sampling position i of the pixel, and $y_i$ is y of the sampling position i.

Further, the intersection (first intersection) of the first approximate straight line and the perpendicular line of the intermediate line can be expressed by the following formula (3):

$$x_{c1} = \frac{y_i + \frac{2}{A_1 + A_2}x_i - B_1}{A_1 + \frac{2}{A_1 + A_2}}, \; y_{c1} = \left(\frac{y_i + \frac{2}{A_1 + A_2}x_i - B_1}{A_1 + \frac{2}{A_1 + A_2}}\right)A_1 + B_1, \qquad (3)$$

where $x_{c1}$ is an x-coordinate of the first intersection, and $y_{c1}$ is a y-coordinate of the first intersection.

Then, in step S909, the distance calculation unit 153 calculates an intersection of the second approximate straight line and the perpendicular line of the intermediate line as a second intersection. The second intersection, which is an intersection of the second approximate straight line and the perpendicular line of the intermediate line, can be expressed by the following formula (4):

$$x_{c2} = \frac{y_i + \frac{2}{A_1 + A_2}x_i - B_2}{A_2 + \frac{2}{A_1 + A_2}}, \quad y_{c2} = \left(\frac{y_i + \frac{2}{A_1 + A_2}x_i - B_2}{A_2 + \frac{2}{A_1 + A_2}}\right)A_2 + B_2, \quad (4)$$

where $x_{c2}$ is an x-coordinate of the second intersection, and $y_{c2}$ is a y-coordinate the second intersection.

Next, in step S910, the distance calculation unit 153 calculates a distance d between the first intersection and the second intersection. The distance d between intersections can be expressed by the following formula (5):

$$d = \sqrt{(x_{c1} + x_{c2})^2 + (y_{c1} + y_{c2})^2} \quad (5)$$

FIG. 10 is a diagram illustrating an example of the distance between the first intersection and the second intersection that is acquired by the distance calculation unit 153. In FIG. 10, each sampling position corresponds to a pixel position in the y-direction on the intermediate line, and each distance between the intersections is the distance d between intersections that is calculated in step S910.

Next, in step S911, the distance calculation unit 153 determines whether the process from step S908 to step S910 is performed on all calculation target pixel positions (x-coordinates). In a case where there is an unprocessed pixel position (NO in step S911), the processing returns to step S908, whereas in a case where there is no unprocessed pixel position (YES in step S911), the process in the flowchart in FIG. 9 is ended.

The distance between the first intersection and the second intersection that is calculated by the distance calculation unit 153 corresponds to the width (line width) of the linear illumination image. Specifically, since the distance between the intersections corresponds to the width of the illumination image included in the image captured by the imaging apparatus 111, for example, in a case where the imaging apparatus 111 has a fixed angle of view, the distance between the intersections changes in a case where the image capturing distance from the imaging apparatus 111 to the object changes. For example, in a case where the image capturing distance from the imaging apparatus 111 to the object increases, the distance between the intersections decreases (narrows), whereas in a case where the image capturing distance decreases, the distance between the intersections increases. Specifically, the distance (width of the linear illumination image) between the first intersection and the second intersection has a correlation with the image capturing distance.

<Correction Value Calculation Process And Optical Profile Correction Process>

Figure 11:
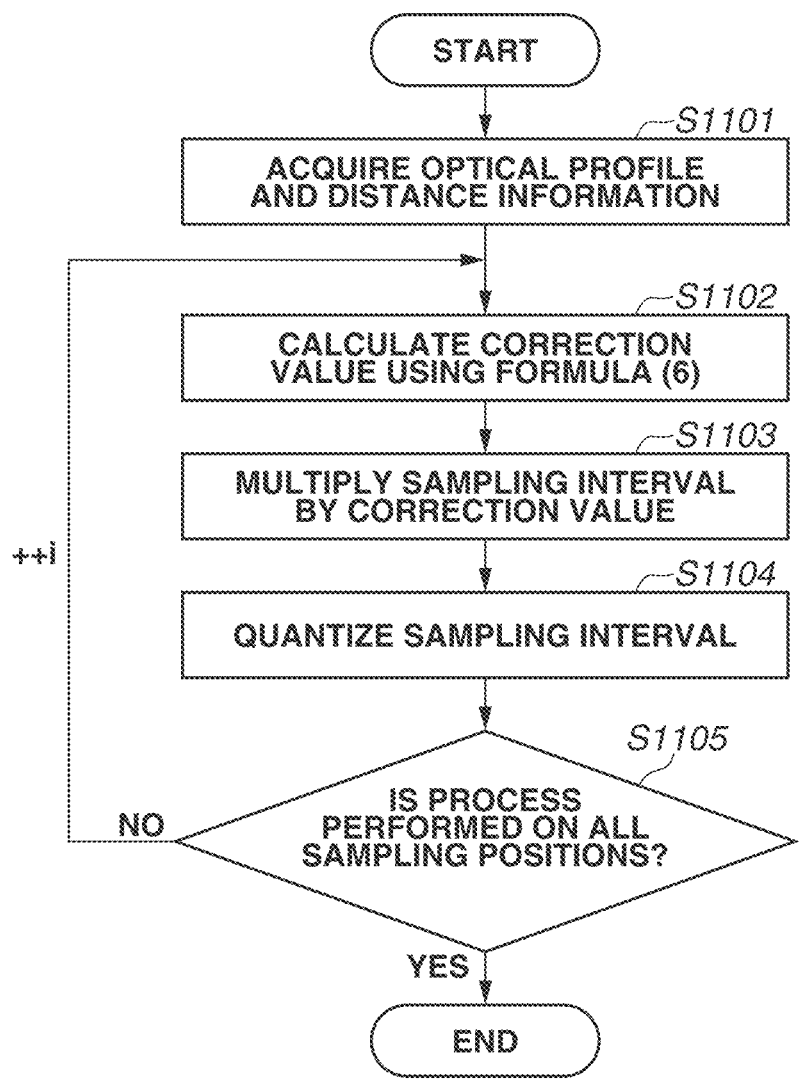
FIG. 11 is a flowchart illustrating an optical profile correction process according to the first exemplary embodiment.

FIG. 11 is a flowchart illustrating a detailed flow of the correction value calculation process and the optical profile correction process performed by the correction unit 154 in steps S206 and S207 in the flowchart in FIG. 2.

First, in step S1101, the correction unit 154 acquires the optical profile from the optical profile calculation unit 152 and acquires the distance information from the distance calculation unit 153.

Next, in step S1102, the correction unit 154 calculates a correction value for the optical profile. A correction value $c_i$ calculated by the correction unit 154 for the sampling position i of the optical profile can be expressed by the following formula (6):

$$c_i = d_i/d_b \quad (6)$$

where $d_b$ is a width (the distance between the first intersection and the second intersection, hereinafter, referred to as "reference line width") of an illumination image in an image captured at a reference distance Disb, which is a reference image capturing distance, and $d_i$ is a width (the distance between the first intersection and the second intersection that is calculated using formula (5)) of an illumination image in an image captured at an image capturing distance $D_i$ different from the reference distance Disb. The reference distance Disb is 500 mm, for example.

Specifically, the correction value $c_i$ is a value of the ratio between the reference line width (the distance $d_b$) in the case where the imaging is performed at the reference distance Disb and the width (the distance $d_i$) of the illumination image in the image captured at the image capturing distance $D_i$ different from the reference distance Disb.

The correction value $c_i$ calculated in step S1102 is used as a correction gain (correction coefficient) for correcting a sampling interval of each sampling position i of the optical profile. Specifically, in next step S1103, the correction unit 154 corrects the optical profile by multiplying the sampling interval of each sampling position i of the optical profile by the correction gain (correction coefficient). Since the sampling interval of the optical profile has a correlation with the frequency of the optical profile, the correction using the correction value can also be referred to as the correction of the frequency of the optical profile.

Next, in step S1104, the correction unit 154 quantizes the sampling interval after the multiplication by the correction gain to the nth power level of two and encodes the sampling interval as an integer. The nth power can be any integer, and n=8 herein as an example. Further, the correction unit 154 calculates an actual object size per unit interval of the corrected optical profile using the following formula (7):

$$S_r = S_b/2^n \quad (7),$$

where $S_b$ is an actual object size per pixel at the reference distance, and $S_r$ is an actual object size per pixel of the corrected optical profile. The actual object sizes are in units of mm.

For example, in a case where the image capturing distance is 500 mm and a horizontal angle of view is 40 degrees, a subject size corresponding to the horizontal angle of view of 40 degrees is 360 mm. In a case where the number of horizontal pixels is 6000, the subject size (actual object size) recorded per pixel is 360/6000=0.06 mm. Further, for example, in a case where the image capturing distance is 1000 mm and the horizontal angle of view is 40 degrees, the subject size corresponding to the horizontal angle of view of 40 degrees is 720 mm. In this case, the subject size (actual object size) recorded per pixel is 720/6000=0.12 mm.

Next, in step S1105, the correction unit 154 determines whether the process from step S1102 to step S1104 is performed on all sampling positions i. In a case where there is an unprocessed sampling position i (NO in step S1105), the processing returns to step S1102, whereas in a case where there is no unprocessed sampling position i (YES in step S1105), the process in the flowchart in FIG. 11 is ended.

<Evaluation Value Acquisition Process>

FIG. 12 is a flowchart illustrating a detailed flow of the evaluation value process performed by the evaluation value calculation unit 155 in step S208 in FIG. 2.

In step S1201, the evaluation value calculation unit 155 acquires the optical profile corrected by the correction unit 154.

Then, in step S1202, the evaluation value calculation unit 155 performs frequency conversion on the corrected optical profile. The frequency conversion on the optical profile in step S1202 is a process of converting space region information (magnitude of the luminance of the optical profile in the case according to the present exemplary embodiment) indicated by a distance into the number of waves present per unit length (number of pixels). Specifically, the frequency conversion is a process of calculating a power with respect to each frequency using discrete Fourier conversion. The unit of frequencies obtained by the frequency conversion is cycle/pixel, so that the conversion into cycle/mm is performed using the actual object size per pixel.

Then, in step S1203, the evaluation value calculation unit 155 converts the frequency of the corrected optical profile into a frequency corresponding to the actual object size per pixel of the corrected optical profile using the following formula (8):

$$f_{mm}(i)=S_r/f_{pix}(i) \qquad (8),$$

where $f_{pix}$ is the frequency before the conversion, and $f_{mm}$ is the converted frequency corresponding to the actual object size.

Next, in step S1204, the evaluation value calculation unit 155 integrates the powers over a predetermined frequency interval of the frequency corresponding to the actual size obtained in step S1203 and calculates the obtained integral value as an evaluation value. The evaluation value is expressed by the following formula (9):

$$P_{eva}=\Sigma_{f1}^{f2} \text{amp} \qquad (9),$$

where $P_{eva}$ is the evaluation value, amp is an amplitude of the frequency, f1 is a lower limit frequency of an integration interval (predetermined frequency interval), and f2 is an upper limit frequency of the integration interval.

As an example of the predetermined frequency interval, a frequency interval corresponding to the actual object size can be used, such as f1=0.1 cycle/mm and f2=1.0 cycle/mm. It is possible to set an interval with a desired frequency designated and to set a plurality of intervals.

Thereafter, in step S1205, the evaluation value calculation unit 155 determines whether the process from step S1202 to step S1204 is performed on all frequency intervals. In a case where there is an unprocessed frequency interval (NO in step S1205), the processing returns to step S1204, whereas in a case where there is no unprocessed frequency interval (YES in step S1205), the process in the flowchart in FIG. 12 is ended.

As described above, the image processing apparatus 1 according to the first exemplary embodiment calculates an optical profile of an illumination image from an image captured by imaging an illuminated object. Further, the image processing apparatus 1 calculates a correction value based on a line width of the illumination image and a reference line width. Then, the image processing apparatus 1 corrects the optical profile using the correction value and evaluates a level of orange peel on a surface of the object based on the corrected optical profile. Thus, the image processing apparatus 1 according to the first exemplary embodiment is capable of evaluating a level of orange peel developed on an object surface, i.e., a state of the object surface that contributes to design quality, even in a case where an image capturing distance changes.

Modified Example

According to the present exemplary embodiment, as described above, an optical profile and distance information are acquired using an edge of an illumination image in an evaluation target range, a correction value is calculated based on the distance information, the optical profile is corrected using the correction value, and an orange peel evaluation value is calculated from the corrected optical profile. While the nearest edge to a start point of the evaluation target range is used according to the present exemplary embodiment, edges are not limited to the nearest edge to the start point, and the nearest edge to an end point of the evaluation target range can also be used.

Alternatively, information about an edge can be acquired from a region between a first edge, which is the nearest edge to the start point, and a second edge, which is the nearest edge to the end point.

Further, while luminance information about an edge on an approximate straight line is used as an optical profile according to the present exemplary embodiment, optical profiles are not limited to luminance information, and information based on a distance between an edge approximate line and an edge can also be used as an optical profile. Specifically, an optical profile can be distance information about a distance between one of first and second edges of an illumination image included in a captured image and an edge approximate line of the illumination image.

Further, while the frequency conversion is performed on the optical profile and the integral value of the powers over the predetermined frequency interval is determined as an evaluation value in the above-described example according to the present exemplary embodiment, evaluation values are not limited to data obtained by frequency conversion, and an evaluation value can be calculated as a variation in data. Specifically, an amount of variation in the calculated values of the optical profile can be calculated, and the orange peel evaluation can be performed based on the amount of variation. For example, in a case where an orange peel level of an object is low, there is little variation in values of the optical profile. Thus, the evaluation value calculation unit 155 calculates an orange peel evaluation value E so that the orange peel evaluation value E is 0 in a case where there is no variation in values of the optical profile and the orange peel evaluation value E increases as an approximate variation increases. In this case, an orange peel evaluation value $P_{eva}$ is calculated based on the following formula (10):

$$P_{eva}=\Sigma_{i=y_{st}}^{y_{ed}} l_i \qquad (10),$$

where $l_i$ is an optical profile value.

Further, while the image acquisition unit 151 acquires the captured image from the HDD 113 according to the present exemplary embodiment, the image acquisition unit 151 can acquire a captured image directly from the imaging apparatus 111.

Further, while the illumination image 304 is generated on the object 301 using the illumination light source 302 according to the present exemplary embodiment, illumination conditions in imaging are not limited to the above-described example. For example, an illumination image can be projected on a surface of the object 301 using a directional line light source as the illumination light source 302. In this case, an edge of a region illuminated with intense light from the line light source can be used. Further, a configuration to acquire a linear illumination image using a shield or a configuration to acquire a linear illumination image using a slit-shaped optical system can be used.

Further, two positions that are a start point and an end point are designated by the user in designating an evaluation target range in the above-described example according to the present exemplary embodiment, information to be designated by the user is not limited to the above-described example. For example, four vertexes of the evaluation target range 604 illustrated as an example in FIG. 6 can be designated by the user. Further, points for defining the evaluation target range 604 are not limited to coordinate value inputs. For example, the user can designate the evaluation target range 604 by drawing a straight line on the image in the image display window 401 in FIG. 4 using the input device 110.

Further, while range designation data representing an evaluation target range is acquired in determining an evaluation target range according to the present exemplary embodiment, the range designation data does not have to be acquired. For example, a predetermined range of an image can be determined as an evaluation target range, or the entire image can be determined as an evaluation target range.

Further, while an average luminance value is used as a threshold for binarization according to the present exemplary embodiment, binarization methods are not limited to the above-described example. For example, the binarization can be performed using a predetermined threshold or can be performed using a publicly-known method such as an Otsu's method using a pixel value histogram.

Further, while the edge detection is performed by determining each pixel having a different pixel value from an adjacent pixel in the x-direction as an edge point according to the present exemplary embodiment, edge detection methods are not limited to the above-described example. For example, an edge detection method in which the second derivative of an image is calculated and a point where an output value changes from positive to negative, i.e., inflection point, is determined as an edge point can be used.

Further, while a calculated evaluation value is displayed on the display 115 according to the present exemplary embodiment, evaluation value output methods are not limited to the above-described example. For example, a calculated evaluation value can be stored in a storage apparatus such as the HDD 113. Further, painting information, such as an environment in object painting and a painting method, can be stored in association with an evaluation value in a storage apparatus such as the HDD 113. In this case, a list of painting information and an associated evaluation value can be displayed so that the user can easily find out a painting method and an environment for painting that are less likely to cause orange peel.

Further, while an object that is flat in shape is used as an evaluation target object according to the present exemplary embodiment, an object that is curved in shape can be used as an evaluation target object. In this case, for example, an edge of the illumination image 304 of the illumination light source 302 on an object surface is curved, so that not the straight line approximation but curve approximation is performed using an approximation method such as polynomial approximation, a spline curve, or a Bézier curve in step S206.

Further, while the input device 110 and the display 115 are separate devices according to the present exemplary embodiment, a touch panel display as an integrated combination of the input device 110 and the display 115 can be used.

Further, while an optical profile is generated by referring to luminances on an intermediate line between a first approximate straight line and a second approximate straight line according to the present exemplary embodiment, optical profile generation methods are not limited to the above-described example. For example, an optical profile (luminance profile) can be generated using an average luminance value of a neighborhood region including the intermediate line.

In the above-described example according to the first exemplary embodiment, a correction value for an optical profile is calculated based on distance information about a distance between two edges of an illumination image in a captured image. There may be a case where two edges cannot be detected from an illumination image and only one edge is detected. Specifically, in this case, distance information having a correlation with an image capturing distance such as a width of the illumination image described above cannot be calculated.

Thus, according to a second exemplary embodiment, image capturing distance information is acquired from, for example, vector data such as three-dimensional computer-aided design (three-dimensional CAD) data or laser ranging data obtained by a laser range finder by measuring a distance of an object. Then, according to the second exemplary embodiment, a correction value is calculated based on the image capturing distance information acquired from the three-dimensional CAD data or the laser ranging data, and an optical profile is corrected using the correction value. Each component/process according to the second exemplary embodiment that corresponds to a component/process according to the first exemplary embodiment is given the same reference numeral as the corresponding component/process to omit redundant descriptions thereof, and mainly differences from the first exemplary embodiment will be described below.

<Functional Configuration of Image Processing Apparatus 1 According to Second Exemplary Embodiment>

FIG. 13 is a functional block diagram illustrating a functional configuration of the image processing apparatus 1 according to the second exemplary embodiment. The image processing apparatus 1 includes the image acquisition unit 151, the optical profile calculation unit 152, a distance acquisition unit 1303, a correction unit 1304, the evaluation value calculation unit 155, and the output unit 156. The distance acquisition unit 1303 according to the second exemplary embodiment acquires image capturing distance information for each pixel position of an image acquired by the image acquisition unit 151 from vector data such as three-dimensional CAD data or laser ranging data from a laser range finder. Details thereof will be described below.

<Operations and Image Processing by Image Processing Apparatus According to Second Exemplary Embodiment>

FIG. 14 is a flowchart illustrating operations and a flow of image processing by the image processing apparatus 1 illustrated in FIG. 13. In the flowchart in FIG. 14, steps S1401 to S1404 are similar in processing to steps S201 to S204 in FIG. 2, and steps S1408 to S1409 are similar in processing to steps S208 to S209 in FIG. 2.

In step S1401, the CPU 101 displays the GUI illustrated in FIG. 4 on the display 115. Next, in step S1402, the image acquisition unit 151 acquires a captured image based on a user instruction via the GUI illustrated in FIG. 4. Then, in step S1403, the optical profile calculation unit 152 acquires an evaluation target range designated by the user. Then, in step S1404, the optical profile calculation unit 152 calculates an optical profile from an image in the evaluation target range.

Next, in step S1405, the distance acquisition unit 1303 acquires image capturing distance information for each pixel position from three-dimensional CAD data and laser ranging data.

Figure 15A:
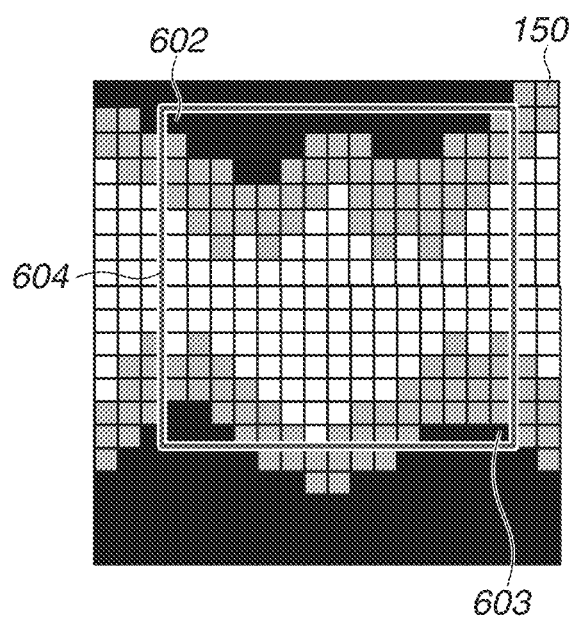
FIGS. 15A and 15B are diagrams illustrating an image and distance information according to the second exemplary embodiment.
Figure 15B:
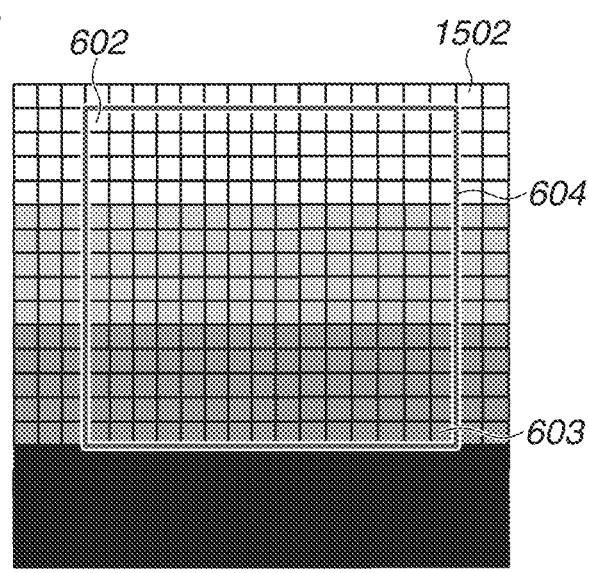

FIGS. 15A and 15B are diagrams for use to describe an image acquired by the distance acquisition unit 1303 according to the second exemplary embodiment and image capturing distance information corresponding to the pixel positions. FIG. 15A illustrate an example of an image acquired in step S1402 and illustrates an example of a case where the evaluation target range 604 is set for an image 1501 as in FIG. 6A. FIG. 15B schematically illustrates a distance map generated by acquiring image capturing distance information for each pixel position of the image 1501 in FIG. 15A from vector data or laser ranging data and shading each pixel position to indicate a gray level corresponding to an image capturing distance for the pixel position. Specifically, the shading in FIG. 15B indicates distance, and darker shades indicate shorter distances whereas lighter shades indicate greater distances. While FIG. 15 illustrates an example where distance information in image form is read, distance information for each pixel position can be rasterized data from vector data.

In FIG. 15B, a vertical axis represents luminance, and a horizontal axis represents sampling position (x, y) corresponding to the pixel positions in the image 1502. The sampling position on the horizontal axis is, for example, a position determined based on three-dimensional CAD data, position information about the evaluation target object, and position information about the imaging apparatus 111. Image capturing distance information, like the optical profile, is acquired as distance information corresponding to the sampling position (x, y) in the image by referring to the values in FIG. 15B.

Next, in step S1406, the correction unit 1304 calculates a correction value (correction coefficient, correction gain) based on the image capturing distance information acquired for the sampling position by the distance acquisition unit 1303.

FIG. 16 is a diagram illustrating an example of image capturing distance information for each sampling position corresponding to a pixel position, and distance is the image capturing distance information acquired in step S1405. Details of the correction value calculation process in step S1406 will be described below.

Next, in step S1407, the correction unit 1304 corrects the optical profile using the correction values calculated for each sampling position (pixel position) in step S1406. Details of the optical profile correction process in step S1407 will be described below.

Then, in step S1408, the evaluation value calculation unit 155 calculates an evaluation value (orange peel evaluation value) based on the optical profile corrected in step S1407. Thereafter, in step S1409, the output unit 156 outputs the evaluation value to the display 115.

<Optical Profile Correction Process>

Figure 17:
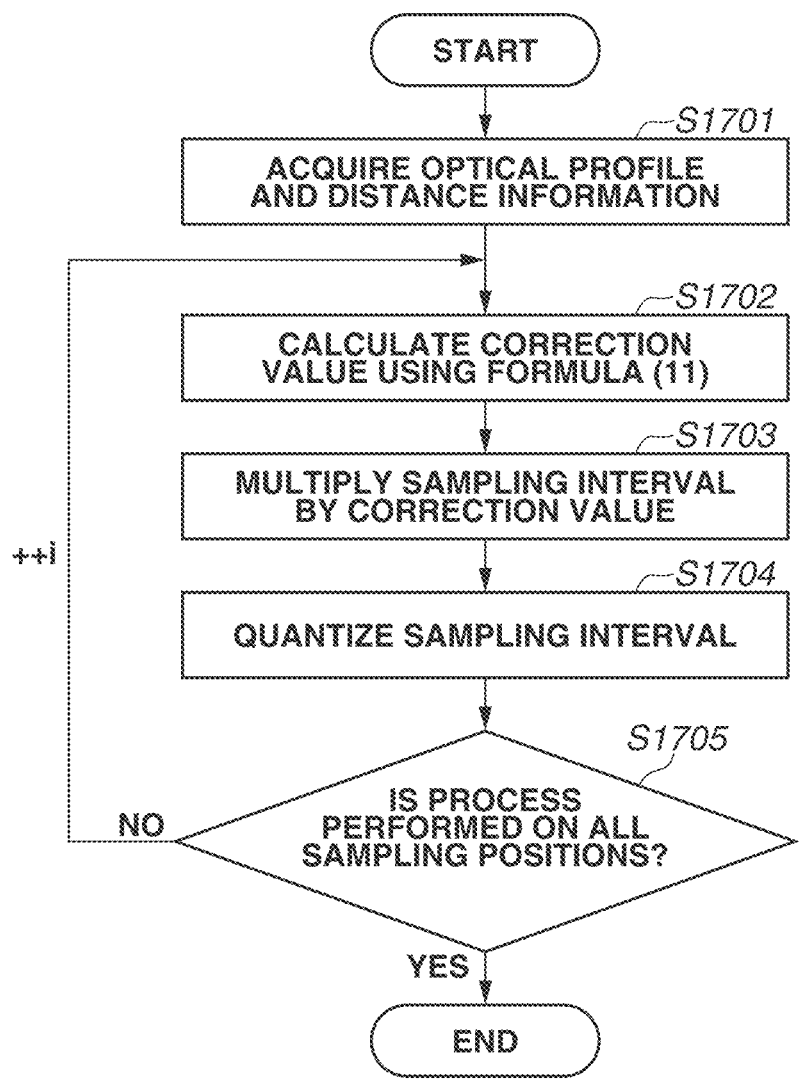
FIG. 17 is a flowchart illustrating an optical profile correction process according the second exemplary embodiment.

FIG. 17 is a flowchart illustrating a detailed flow of the correction value calculation process and the optical profile correction process performed by the correction unit 1304 in steps S1406 and S1407.

In step S1701, the correction unit 1304 acquires the optical profile from the optical profile calculation unit 152 and acquires the image capturing distance information from the distance acquisition unit 1303.

Next, in step S1702, the correction unit 1304 calculates a correction value $C_i$ for a sampling position i of the optical profile. The correction value $C_i$ calculated for the sampling position i of the optical profile by the correction unit 1304 according to the second exemplary embodiment is expressed by the following formula (11):

$$\text{correction value } C_i = D_i/D_b \quad (11),$$

where $D_b$ is a reference image capturing distance (reference distance) between the imaging apparatus 111 and the evaluation target object, and $D_i$ is an image capturing distance acquired for the sampling position i of the optical profile from a distance map generated based on vector data and laser ranging data as illustrated in FIG. 15B described above. According to the present exemplary embodiment, the image capturing distance $D_i$ is a distance different from the reference distance $D_b$.

Specifically, according to the second exemplary embodiment, the correction value $C_i$ is a value of the ratio between the reference image capturing distance $D_b$ and the image capturing distance $D_i$ of the sampling position i.

Next, in step S1703, the correction unit 1304 corrects the optical profile by multiplying the sampling interval of the sampling position i by the correction value (correction gain).

Then, in step S1704, the correction unit 1304 quantizes the sampling interval of the corrected optical profile to the nth power level of two and encodes the sampling interval as an integer.

Thereafter, in step S1705, the correction unit 1304 determines whether the process from step S1702 to step S1704 is performed on all sampling positions i. In a case where there is an unprocessed sampling position i (NO in step S1705), the processing returns to step S1702, whereas in a case where there is no unprocessed sampling position i (YES in step S1705), the process in the flowchart in FIG. 17 is ended.

As described above, the image processing apparatus 1 according to the second exemplary embodiment calculates an optical profile of an illumination image from a captured image of an object that is acquired by imaging the object being illuminated as in the first exemplary embodiment and acquires an image capturing distance from three-dimensional CAD data or ranging data of the laser range finder. Then, the image processing apparatus 1 calculates a correction value based on the image capturing distance information, corrects the optical profile using the correction value, and calculates an orange peel evaluation value based on the corrected optical profile. Thus, the image processing apparatus 1 according to the second exemplary embodiment is capable of evaluating a level of orange peel developed on an object surface even in a case where an image capturing distance changes.

Modified Example of Second Exemplary Embodiment

While distance information is acquired for each pixel position in the above-described example according to the second exemplary embodiment, the distance acquisition unit 1303 can calculate image capturing distance information based on position information about the imaging apparatus 111, object position information, and object shape information.

According to the first exemplary embodiment, the distance calculation unit 153 calculates a width of an illumination image in an image captured at the image capturing distance $D_i$ as distance information. Further, the correction unit 154 calculates a value of the ratio between the reference line width at the reference distance Disb and the width of the illumination image in the image captured at the image capturing distance $D_i$ as the correction value $c_i$. In a case where the reference distance Disb and the reference line width are known, the image capturing distance $D_i$ can be calculated based on the relationship between the width of the illumination image in the image captured at the image capturing distance $D_i$ and the known reference line width. Specifically, since the relationship between the width of the illumination image in the image captured at the image capturing distance $D_i$ and the reference line width has a correlation with the relationship between the reference distance Disb and the image capturing distance $D_i$, if the width of the illumination image in the image captured at the image capturing distance $D_i$ is calculated, the image capturing distance $D_i$ is also calculated. Furthermore, if the reference distance Disb according to the first exemplary embodiment is equal to the reference distance $D_b$ according to the second exemplary embodiment, the correction value $C_i$ is calculated from formula (11) using the reference distance $D_b$, which is the reference distance Disb, and the image capturing distance $D_i$. Thus, the correction value is calculated based on the image capturing distance from the imaging apparatus 111 to the evaluation target object also according to the first exemplary embodiment.

In the above-described examples according to the first and second exemplary embodiments, a frequency of an optical profile is corrected based on distance information. It is known that images captured by the imaging apparatus 111 have different amplitudes (response characteristics) depending on different modulation transfer function (MTF) characteristics of a lens of the imaging apparatus 111. Thus, according to a third exemplary embodiment, an amplitude of an optical profile is also corrected considering a characteristic of a transfer function of a lens in addition to the frequency correction on the optical profile as in the above-described exemplary embodiments. This example will be described below. Redundant descriptions of each component or process according to the third exemplary embodiment that corresponds to a component or process according to the first exemplary embodiment are omitted. Points according to the third exemplary embodiment that are different from the above-described exemplary embodiments will mainly be described below. Further, the image processing apparatus 1 according to the third exemplary embodiment has a similar functional configuration to that in FIG. 1B, so that the functional configuration will be described below with reference to the functional blocks in FIG. 1B.

<Optical Profile Correction Process>

Figure 18:
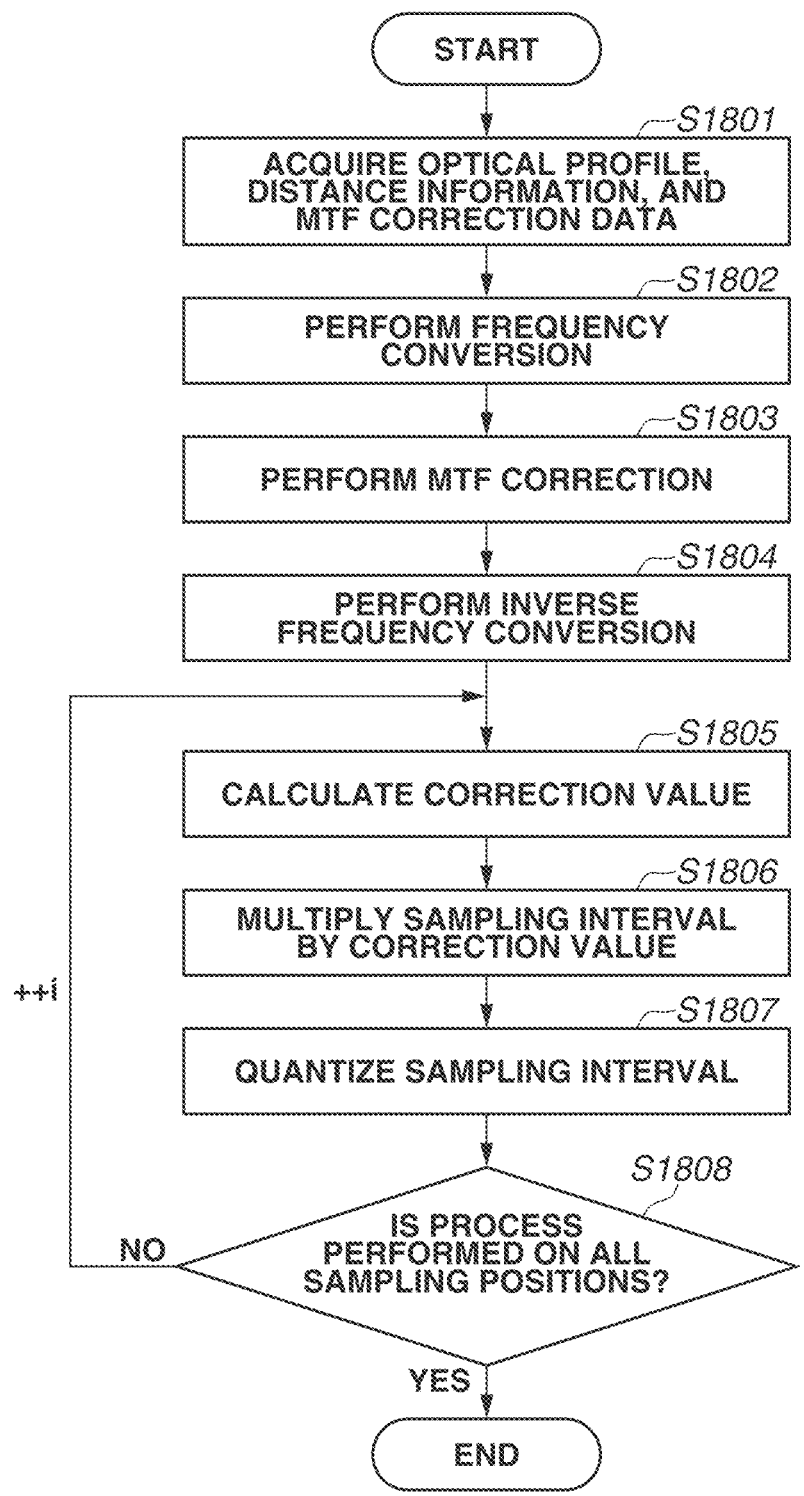
FIG. 18 is a flowchart illustrating an optical profile correction process according to a third exemplary embodiment.

FIG. 18 is a flowchart illustrating a detailed flow of the correction value calculation process and the optical profile correction process performed by the correction unit 154 in steps S206 and S207 in FIG. 2 according to the third exemplary embodiment.

First, in step S1801, the correction unit 154 acquires an optical profile and distance information as in the first exemplary embodiment. According to the third exemplary embodiment, the correction unit 154 further acquires correction data for the imaging optical system of the imaging apparatus 111, i.e., modulation transfer function (MTF) correction data for the lens. FIG. 19 is a diagram illustrating an example of MTF correction data, and the MTF correction data uses a reciprocal of a Wiener spectrum of the MTF of the lens. As illustrated in FIG. 19, the MTF correction data is prepared as a lookup table storing correction data for each frequency.

Next, in step S1802, the correction unit 154 performs frequency conversion on the optical profile.

Then, in step S1803, the correction unit 154 acquires MTF correction data corresponding to the frequency converted in step S1802 from the lookup table in FIG. 19 and multiplies the MTF correction data as a correction gain. Specifically, according to the third exemplary embodiment, the correction unit 154 corrects the optical profile using a correction value acquired from the lookup table in FIG. 19 as a first correction value. Consequently, the amplitude of the optical profile is corrected based on the MTF correction data.

Next, in step S1804, the correction unit 154 performs inverse frequency conversion on the optical profile having undergone the amplitude correction using the MTF correction data.

Next, in step S1805, the correction unit 154 calculates the correction value $c_i$ for the sample position i as in step S1102 in FIG. 11. Specifically, according to the third exemplary embodiment, the correction unit 154 calculates, as a second correction value, the correction value $c_i$ calculated based on the line width of the illumination image and the reference line width as in the first exemplary embodiment.

Then, in step S1806, the correction unit 154 multiplies the sampling interval for the sample position i by the correction value $c_i$ (correction gain) as in step S1103 in FIG. 11. Specifically, in step S1806, the frequency of the optical profile is corrected using the correction value $c_i$ (second correction value).

Thereafter, in step S1807, the correction unit 154 quantizes the sampling interval corrected by the multiplication by the correction data to the nth power level of two and encodes the sampling interval as an integer as in step S1104 in FIG. 11.

Then, in next step S1808, the correction unit 154 determines whether the process is performed on all sampling positions i as in step S1105 in FIG. 11, and in a case where there is an unprocessed sampling position i (NO in step S1808), the processing returns to step S1805, whereas in a case where there is no unprocessed sampling position i (YES in step S1808), the process in the flowchart in FIG. 18 is ended.

As described above, the image processing apparatus 1 according to the third exemplary embodiment determines the MTF correction data for correcting the MTF characteristic of the optical profile as a first correction value and determines the calculated correction value as a second correction value as in the first exemplary embodiment. Then, the image processing apparatus 1 according to the third exemplary embodiment corrects the amplitude of the optical profile using the first correction value and corrects the frequency of the optical profile using the second correction value. Thereafter, the image processing apparatus 1 calculates an orange peel evaluation value based on the corrected optical profile. This makes it possible to evaluate a level of orange peel developed on an object surface, i.e., an object surface state that contributes to design quality, even in a case where the image capturing distance changes. Especially, since both the frequency and amplitude of the optical profile are corrected according to the third exemplary embodiment, an evaluation value with greater accuracy is acquired.

Modified Example of Third Exemplary Embodiment

While the amplitude of the optical profile is corrected by correcting the optical profile based on the MTF correction data according to the third exemplary embodiment as described above, the correction based on the MTF correction data can be performed before the optical profile calculation. Specifically, the correction based on the MTF correction data can be performed on a captured image acquired by the imaging apparatus 111, and an optical profile can be acquired from the captured image corrected based on the MTF correction data.

Further, while the MTF correction data is used in the form of a lookup table in the above-described example according to the third exemplary embodiment, a reciprocal can be calculated by function approximation of the MTF characteristic.

Further, in third exemplary embodiment, while the second correction value is calculated based on distance information calculated by a similar process to the first exemplary embodiment and the frequency of the optical profile is corrected, the second correction value can be calculated using three-dimensional CAD data or laser ranging data as in the second exemplary embodiment.

Embodiments of the present disclosure enable evaluation of a surface state of an evaluation target object even in a case where an image capturing distance changes.

OTHER EMBODIMENTS

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-091794, which was filed on Jun. 6, 2022 and which is hereby incorporated by reference herein in its entirety.

What is claimed is:

1. An image processing apparatus comprising:
one or more processors that are configured to:
acquire image data acquired by capturing an image of an object;
acquire distance information about a distance from an imaging apparatus, by which the image of the object is captured, to the object;
calculate a correction value for a first optical profile representing an attribute of an image reflected on a surface of the object based on reference distance information and the acquired distance information;
acquire a second optical profile by correcting, using the correction value, the first optical profile generated based on the image data; and
evaluate a state of the surface of the object based on the second optical profile.

2. The image processing apparatus according to claim 1, wherein the captured image of the object is an image including a linear illumination image with a linear illumination projected on the surface of the object, and
wherein the one or more processors are further configured to acquire the first optical profile from the linear illumination image included in the captured image of the object.

3. The image processing apparatus according to claim 1, wherein the distance information about the distance from the imaging apparatus to the object is distance information acquired using a laser range finder.

4. The image processing apparatus according to claim 1, wherein the distance information about the distance from the imaging apparatus to the object is calculated based on position information about the object, three-dimensional computer-aided design (three-dimensional CAD) data on the object, and position information about the imaging apparatus.

5. The image processing apparatus according to claim 1, wherein the one or more processors are further configured to correct a frequency of the first optical profile.

6. The image processing apparatus according to claim 5, wherein the one or more processors are further configured to correct an amplitude of the first optical profile before the acquisition of the second optical profile based on data for correcting a characteristic of a transfer function of an imaging optical system of the imaging apparatus by which the captured image of the object is captured.

7. The image processing apparatus according to claim 5, wherein the one or more processors are further configured to convert the corrected frequency of the first optical profile into a frequency corresponding to an actual size of the object per pixel of the corrected first optical profile and calculate, as an evaluation value, an integral value of a predetermined frequency interval of the frequency corresponding to the actual size.

8. The image processing apparatus according to claim 1, wherein the one or more processors media are further configured to calculate an amount of variation in the second optical profile as an evaluation value.

9. The image processing apparatus according to claim 2, wherein the first optical profile is luminance information about the illumination image included in the captured image of the object.

10. The image processing apparatus according to claim 9, wherein the first optical profile is luminance information about an approximate line of an edge of the illumination image included in the captured image of the object.

11. The image processing apparatus according to claim 10, wherein the first optical profile is luminance information about an approximate line of one of a first edge and a second edge of the illumination image included in the captured image of the object.

12. The image processing apparatus according to claim 9, wherein the first optical profile is luminance information about a region between a first edge and a second edge of the illumination image included in the captured image of the object.

13. The image processing apparatus according to claim 10, wherein the approximate line of the edge is a straight line or a curve.

14. The image processing apparatus according to claim 2, wherein the first optical profile is distance information about a distance between an edge of the illumination image included in the captured image of the object and an approximate line of the edge.

15. An image processing method comprising:
    acquiring image data acquired by capturing an image of an object;
    acquiring distance information about a distance from an imaging apparatus by which the image of the object is captured to the object;
    calculating a correction value for an optical profile representing an attribute of an image reflected on a surface of the object based on reference distance information and the distance information about the distance in capturing the captured image of the object by the imaging apparatus;
    acquiring an optical profile representing an attribute of an image reflected on a surface of the object by correcting, using the correction value, an optical profile generated based on the image data; and
    evaluating a state of the surface of the object based on the optical profile.

16. A non-transitory computer-readable storage medium storing instructions that, when executed by a computer, cause the computer to perform an image processing method, the image processing method comprising:
    acquiring image data acquired by capturing an image of an object;
    acquiring distance information about a distance from an imaging apparatus by which the image of the object is captured to the object;
    calculating a correction value for an optical profile representing an attribute of an image reflected on a surface of the object based on reference distance information and the distance information about the distance in capturing the captured image of the object by the imaging apparatus;
    acquiring an optical profile representing an attribute of an image reflected on a surface of the object by correcting, using the correction value, an optical profile generated based on the image data; and
    evaluating a state of the surface of the object based on the optical profile.

* * * * *